(12) United States Patent
Zuzga et al.

(10) Patent No.: US 8,005,943 B2
(45) Date of Patent: Aug. 23, 2011

(54) PERFORMANCE MONITORING OF NETWORK APPLICATIONS

(75) Inventors: Brian Zuzga, San Francisco, CA (US); John B. Bley, San Mateo, CA (US); Mark Jacob Addleman, San Francisco, CA (US); Krates Ng, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 972 days.

(21) Appl. No.: 11/284,567

(22) Filed: Nov. 21, 2005

(65) Prior Publication Data

US 2007/0083649 A1 Apr. 12, 2007

Related U.S. Application Data

(60) Provisional application No. 60/725,780, filed on Oct. 12, 2005, provisional application No. 60/734,560, filed on Nov. 8, 2005.

(51) Int. Cl.
*G06F 15/173* (2006.01)
*G06F 3/00* (2006.01)

(52) U.S. Cl. ........................... 709/224; 719/331

(58) Field of Classification Search .................. 709/224, 709/204, 248; 719/331; 702/122; 717/124
See application file for complete search history.

(56) References Cited

U.S. PATENT DOCUMENTS

| | | | | |
|---|---|---|---|---|
| 5,621,663 A * | 4/1997 | Skagerling | ...... | 702/186 |
| 5,627,766 A * | 5/1997 | Beaven | ...... | 702/122 |
| 5,655,081 A * | 8/1997 | Bonnell et al. | ...... | 709/202 |
| 5,812,780 A * | 9/1998 | Chen et al. | ...... | 709/224 |
| 5,898,873 A * | 4/1999 | Lehr | ...... | 717/125 |
| 5,978,594 A * | 11/1999 | Bonnell et al. | ...... | 710/17 |
| 6,061,725 A * | 5/2000 | Schwaller et al. | ...... | 709/224 |
| 6,108,677 A * | 8/2000 | Kiuchi et al. | ...... | 707/741 |
| 6,141,699 A * | 10/2000 | Luzzi et al. | ...... | 719/331 |
| 6,332,212 B1 * | 12/2001 | Organ et al. | ...... | 717/128 |
| 6,397,359 B1 * | 5/2002 | Chandra et al. | ...... | 714/712 |
| 6,408,335 B1 * | 6/2002 | Schwaller et al. | ...... | 709/224 |
| 6,446,028 B1 * | 9/2002 | Wang | ...... | 702/186 |
| 6,625,648 B1 * | 9/2003 | Schwaller et al. | ...... | 709/224 |
| 6,763,380 B1 * | 7/2004 | Mayton et al. | ...... | 709/224 |
| 6,807,575 B1 * | 10/2004 | Emaru et al. | ...... | 709/224 |
| 6,853,982 B2 * | 2/2005 | Smith et al. | ...... | 705/26.7 |
| 6,950,852 B1 * | 9/2005 | Kobayaghi et al. | ...... | 709/204 |

(Continued)

OTHER PUBLICATIONS

London, K., Dongarra, J., Moore, S., Mucci, P., Seymour, K., Spencer, T., "End-user Tools for Application Performance Analysis, Using Hardware Counters", Aug. 8-10, 2001, International Conference on Parallel and Distributed Computing Systems, Dallas, TX, pp. 1-11.*

(Continued)

*Primary Examiner* — Firmin Backer
*Assistant Examiner* — Michael A Chambers
(74) *Attorney, Agent, or Firm* — Vierra Magen Marcus & DeNiro LLP

(57) ABSTRACT

Network performance is monitored using timing information retrieved from a client device, server in communication with the client, or both. Client side timing information is retrieved using performance monitoring code provided by the server. The code may be provided to the client as part of a content response. Once content in the provided content response is loaded, the code sends the timing information to the server. The server may then process the timing information to calculate response time and other time information metrics.

45 Claims, 23 Drawing Sheets

U.S. PATENT DOCUMENTS

| | | | |
|---|---|---|---|
| 6,968,509 B1 * | 11/2005 | Chang et al. | 715/802 |
| 6,976,093 B2 * | 12/2005 | Lara et al. | 709/248 |
| 7,093,251 B2 * | 8/2006 | Tsun et al. | 718/100 |
| 7,107,273 B2 * | 9/2006 | Ohata et al. | 707/10 |
| 7,254,601 B2 * | 8/2007 | Baller et al. | 709/200 |
| 7,260,645 B2 * | 8/2007 | Bays | 709/238 |
| 2002/0112050 A1 * | 8/2002 | Ullmann et al. | 709/224 |
| 2002/0174174 A1 * | 11/2002 | Ramraj et al. | 709/203 |
| 2002/0184363 A1 * | 12/2002 | Viavant et al. | 709/224 |
| 2004/0098480 A1 * | 5/2004 | Sekizawa | 709/224 |
| 2004/0199633 A1 * | 10/2004 | Pearson | 709/226 |
| 2004/0230954 A1 * | 11/2004 | Dandoy | 717/124 |
| 2005/0213501 A1 * | 9/2005 | Fontana et al. | 370/229 |
| 2005/0246524 A1 * | 11/2005 | Brownell et al. | 713/156 |
| 2005/0268136 A1 * | 12/2005 | Kostadinov et al. | 713/400 |
| 2006/0224727 A1 * | 10/2006 | Kumakura et al. | 709/224 |
| 2008/0114875 A1 * | 5/2008 | Anastas et al. | 709/224 |

OTHER PUBLICATIONS

Office Action dated Mar. 31, 2009 in U.S. Appl. No. 11/566,684.

Response to Office Action filed Jun. 29, 2009 in U.S. Appl. No. 11/566,684.

* cited by examiner

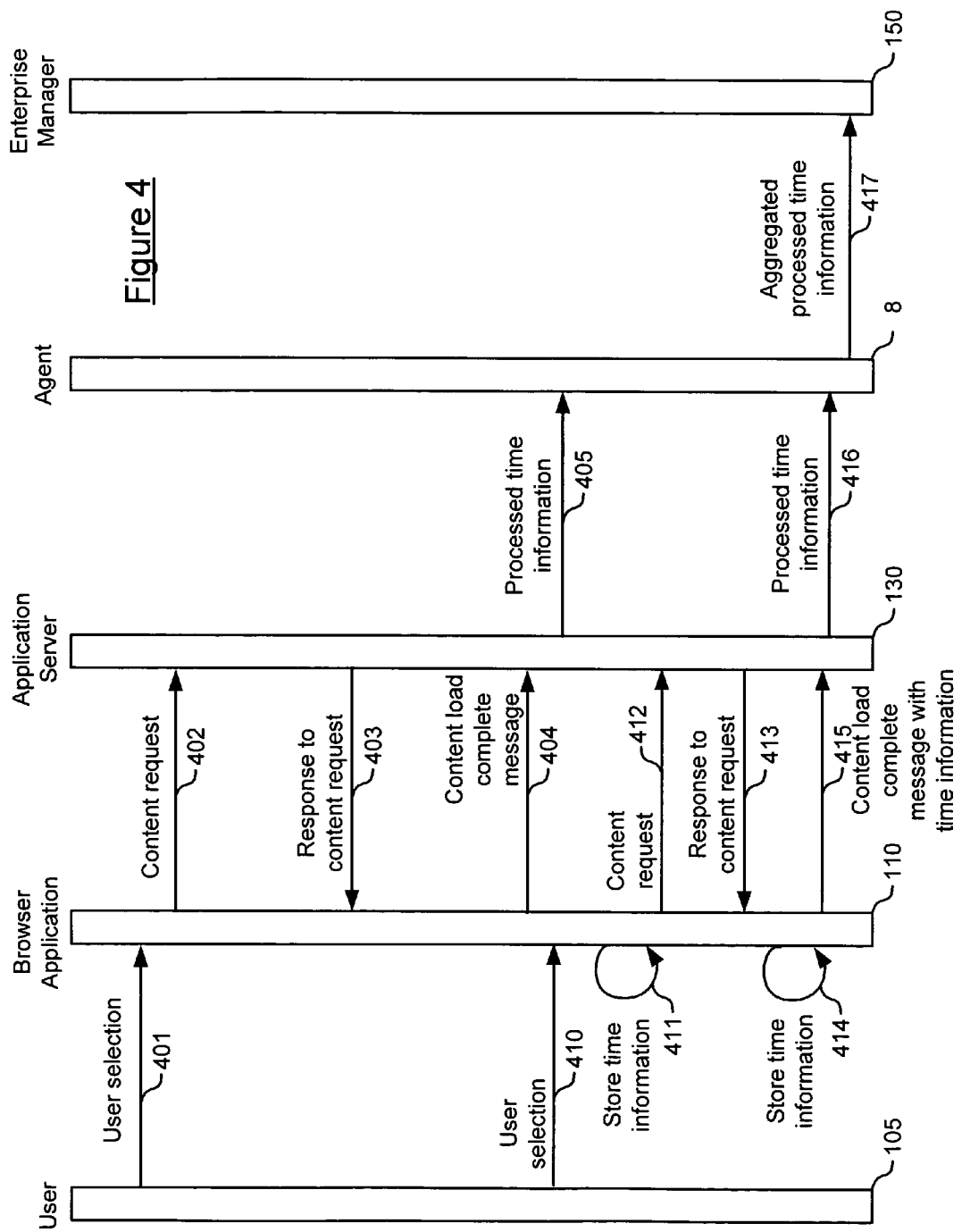

| Request Unique Id | Servlet |
|---|---|
| 1 | Servlet A |
| 2 | Servlet B |
| 3 | Servlet C |
| 4 | Servlet D |

Figure 15

PERFORMANCE MONITORING OF NETWORK APPLICATIONS

This application claims the benefit of U.S. Provisional Application No. 60/725,780, filed on Oct. 12, 2005, entitled "Performance Monitoring of Network Applications Using Filters," having inventors Brian Zuzga, John Bley, Mark Addleman, Krates Ng, and U.S. Provisional Application No. 60/734,560, filed on Nov. 8, 2005, entitled "Performance Monitoring of Network Applications", having inventors Brian Zuzga, John Bley, Mark Addleman, Krates Ng.

BACKGROUND

As more services and information become available over the Internet, the number of users that access the Internet and use these services increases. These users have a variety of choices in selecting which web sites to use for services such as travel planning, online banking, news reporting, etc.

With the variety of services available, a user may have many choices of providers to use for a particular Internet service. Thus, a company providing a service over the Internet should do whatever possible to distinguish itself from its competitors and ensure that it is providing a positive user experience through its web service. To achieve this, some web service providers monitor the provided web service to determine any problems or delays in providing the service to users.

Previously, performance of a web service was monitored by adding a component between the client device and an application server. The component determines times between transmission events for the client device and application server. However, the interposed component introduces additional delays in the communication between the client device and the application server.

Another previous system for monitoring web service performance captures times associated with server-side events during communication with a client device. An application server of the server-side time capture system receives a content request from a client device. After receiving the request, the server generates a content response which includes page load notification code and sends the response to the client device. An Internet browser at the client loads the content in the response and executes the page load notification code. When the content loading is completed, the code sends a page load notification message to the application server. The application server then determines the response time for the web service as the difference between the time the content request was received and the time the page load notification message was received at the application server.

The server-side time capture system for monitoring a web service shall be discussed in more detail. The system includes a client device, an application server, an agent and a manager application. The client device includes an Internet browser (or browser application). The content request is initiated by the browser application on the client in response to receiving user input. The time at which the server receives the request from the client is stored by the server. The server then generates a content response for the request. The content response includes requested content, a response identifier and page load notification code. The server sends the generated response to the client device. The page load notification message sent after content has been loaded includes the response identifier and is in the form of an image content request. When the server receives the page load notification message, it captures the current time at the server. The server-side captured response times are then sent to an agent module. The agent module aggregates the response time information and forwards aggregated response time information to a manager application.

The application server generates the response using a servlet and servlet filters. A custom servlet filter is used to insert the page load notification code into the response. Bytecode generation is used to generate the custom servlet filter within an application. To generate the filter, an application management tool may instrument the application's object code (also called bytecode). An application uses probes to access information from the application. A probe builder instruments (e.g. modifies) the bytecode for the application to add probes and additional code to the application. By adding the probes, the application becomes a managed application. The probes may measure specific pieces of information about the application without changing the application's business logic. The probe builder also generates the agent module. The agent may be installed on the same machine as the managed application or a separate machine. More information about instrumenting byte code can be found in U.S. Pat. No. 6,260,187 "System For Modifying Object Oriented Code" by Lewis K. Cirne, and U.S. patent application Ser. No. 09/795,901, filed Feb. 28, 2001, entitled "Adding Functionality to Existing Code at Exits," having inventor Jeffrey Cobb, both of which are incorporated herein by reference in its entirety. In one embodiment, the technology described herein does not actually modify source code. Rather, the present invention modifies object code. The object code is modified conceptually in the same manner that source code modifications are made.

To configure the application server of the server-side time capture system to process requests, the application server is initialized. After the server is initialized, application servlet filters are loaded and instantiated into servlet containers. To load and instantiate the application servlet filters, an application server configuration file is accessed and loaded to determine the current servlet filters associated with the application servlet container. Once the current servlet filters are determined, additional servlet filters are added into the servlet filter chain. The custom servlet data is added to a configuration file entitled, "web.xml" of the application server. The custom servlet filter data is added such that custom servlet filter is the first to process a content request for a servlet and last to process an outgoing content response from a servlet. The application server configuration file with modified servlet chain data is stored as an object in the application server memory.

The application file on the application server is then initialized, and the stored application server configuration file is read. The configuration file is read by the servlet container in preparation for instantiating servlets and servlet filters. Individual servlet filter class files are then loaded and instantiated. The individual servlet filter class files include both custom servlet class files and pre-existing servlet class files. This creates a data structure of servlet filters which will be used to process incoming content requests. Next, request templates for a servlet and servlet filter chains are generated and cached. Templates consisting of a chain of processing servlet filters and servlets are generated for particular URLs.

When a content request is received by the configured application server, the server generates a content response. The content response is generated at the application server by a servlet and a chain of one or more servlet filters. Once the content request is received by the application server, the server generates a request object and a response object. The request and response objects are routed through the chain of servlet filters and then to the servlet. The servlet generates the response from the response object, and the response is routed through the servlet filters again before being sent to the requesting client device.

The servlet filter chain includes a custom servlet filter inserted by bytecode instrumentation. When the request is routed through the servlet filters to the servlet, custom servlet filter assigns a request identifier to the request. The request identifier is stored with the request as it is processed by the servlet and servlet filters. The request identification number and corresponding servlet identification information are stored in a servlet table. The custom servlet filter also wraps the response object in a wrapper. The response object wrapper detects whether a writing object or output stream is used to generate the body of the response and can provide that information to a requesting entity.

When processing the response generated by the servlet, the custom servlet filter adds JavaScript page load notification code to the response. When adding the page load notification code to the content response, the custom servlet filter confirms the response is in HTML and whether the response was written using an available writer or an output stream. The custom servlet determines if the response is in HTML by placing a call to a response object method for retrieving a Multi-Purpose Internet Mail Extension (MIME) type of the response object. The response from the get MIME type method indicates whether the MIME type is HTML or some other format. If the response is determined to be HTML, a Get Writer query is made to the response object wrapper. The page load notification code is then written to the response using either an output stream if used to generate the response, the writer used to generate the response, or an alternative writer that may be used to write to the response. If the response is not in HTML or there is no writer available to write code to the response which was generated with a writer, then the code is not inserted into the response by the custom servlet filter.

After writing the response, the response is sent to the client device. The client device receives the response and provides the response to the browser application. The page load notification code is then registered with the browser application and executed. When executed, the page load notification code registers a function with an On Load event handler at the browser application.

When an On Load handler already exists, the page load notification code places the function before the existing code in the On Load handler such that the added code is executed first. The function is JavaScript code that, when executed, sends a page load notification message to the application server. The page load notification message includes the request identification information assigned to the response by the custom servlet filter. The page load notification code is executed upon the detection of a browser application On Load event.

The page load notification message is in the form of an image source request message. Thus, the message requests image data from the application server. The message includes the request identification information in the name of the site request, such that the message is sent to: HTTP://(site)/ID=A, wherein A is the request identification information. The receiving application server "site" extracts the request identification information included in the site link and transmits a response to the image source request. The response is a transparent image having a 1×1 pixel array.

After the client device sends the page load notification message, the application server receives the message. The application server routes the received message to the appropriate processing servlet within the application server. The application server determines the appropriate servlet by retrieving the servlet identifier from the servlet identification table which is associated with the request identification information in the response. The processing servlet determines the time the page load notification message was received, determines the response time based on server side events, and sends an image content response to the browser application. The image content response includes a transparent 1×1 pixel matrix.

After processing the response, the servlet sends the time response to the agent application. The agent application then stores and aggregates the received time data at step 1420. The aggregated time data is then sent to the manager application. The data may then be reported by the manager application to a workstation or database. The manager application receives performance data from managed applications via the Agent application, runs requested calculations, makes performance data available to workstations and optionally sends performance data to a database for later analysis. The workstations are the graphical user interface for viewing performance data. The workstations are used to create custom views of performance data which can be monitored by a human operator. The workstations consist of two main windows: a console and an explorer. The console displays performance data in a set of customizable views. The explorer depicts alerts and calculators that filter performance data so that the data can be viewed in a meaningful way.

The server-side time capture system is able to capture server-side information related to web service response time, but is not able to accurately determine the actual response time involved with a web service which provides content to a user at a client device. Rather, the server-side time capture system approximates the response time by recording times at the server that are associated with communications with the client device. The server-side time capture system also does not account for situations when the client device may go "off grid" and access other content before completely loading the content provided by the application server. Accurate assessment of web service performance is important to evaluating the service provided to users.

SUMMARY

The technology herein, roughly described, pertains to monitoring the performance of a web service which provides content to a client device over a network. A client device captures time information associated with a content request initiated by a user. The time information captured by the client device is sent to a server. A time response and other information associated with the content request is determined from the client captured timing information, server captured timing information and other information.

Once the server receives the timing information, it may process the information to determine how to calculate the time response and other information. For example, the timing response may be calculated from client-side captured data, server-side captured data, other data, or a combination thereof. Additionally, the server may determine whether or not a client has gone "off grid" and retrieved information from an intervening server while providing the response received from the server.

A content request is generated in response to receiving user input at the client and sent to a server. The server generates a content response for a content request. The content response may include the requested content and performance monitoring code. The response time can be calculated from time information retrieved at the client by the performance monitoring code, an application server in communication with the client, or both. The response time data may be processed, aggregated and/or provided to an administrator, backend user, or other software, hardware, or person for further analysis.

Performance monitoring code may retrieve time information at a client. The client may receive the performance monitoring code from an application server as part of a content response. When the response is received by the client, the performance monitoring code is retrieved and executed. The executed code captures timing information associated with content requests and content responses, as well as other information. In the case of content provided through a content page having two or more frames, timing information is captured for each frame. The code can then send timing information to the application server. In one embodiment, the performance monitoring code may be implemented as JavaScript or some other type of code.

In one embodiment, the performance monitoring code registers code with one or more event handlers of a client application. When a particular event is detected, the corresponding handler can execute code inserted by the performance monitoring code. As a result, the code in the event handler may retrieve and store a time associated with an event, store information on the client, retrieve information from client files, send information over a network, or perform some other operation.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software (stored on a storage device) implementing the present invention is used to program one or more processors. The one or more processors can be in communication with one or more storage devices, peripherals and/or communication interfaces.

BRIEF DESCRIPTION OF THE DRAWINGS

FIG. 4 illustrates an embodiment of a sequence diagram for the present invention.

FIG. 15 illustrates an example of a servlet identification table.

DETAILED DESCRIPTION

Figure 1A:
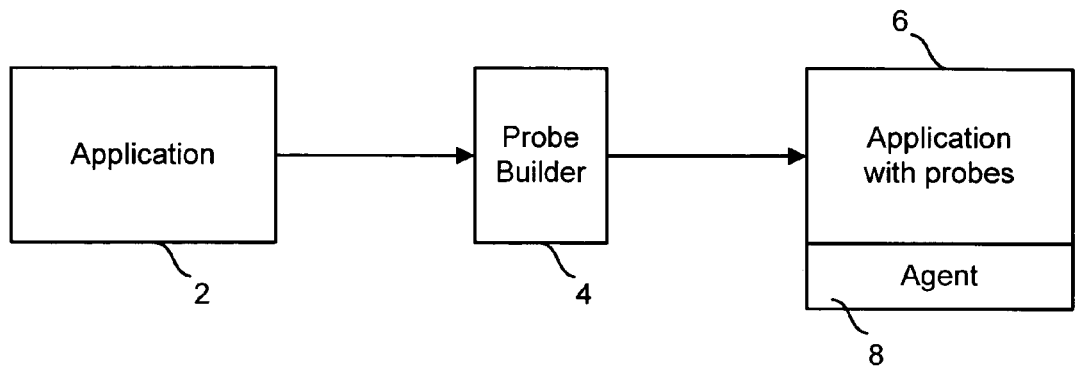
FIG. 1A is a block diagram describing how bytecode for an application is instrumented.

Performance monitoring of a web service is achieved by determining a response time and other timing metrics associated with content provided to a user over a network. A timing mechanism captures timing information associated with a content request initiated by a user at a client. Timing information may be captured at the client device and a server. The timing information captured at the client is provided to the server for processing.

Once the server receives the timing information, it processes the information to calculate the time response and other information. The timing response may be calculated from client-side captured data, server-side captured data, other data, or a combination thereof. The server may also process the timing information to determine whether a client has gone "off grid" and retrieved information from an intervening server while processing a content response from the server.

Time information can be retrieved at a client by performance monitoring code. The client may receive the performance monitoring code from an application server. In one embodiment, an application server may generate a response for a request received from the client. When generating the response, the application server inserts performance monitoring code into the response. When the response is received by the client, the performance monitoring code is retrieved and executed. The executed code captures timing information associated with content requests from the client. The code can then report timing information to an application server.

In one embodiment, the performance monitoring code registers code with one or more event handlers of a client application. The event handlers may include an On Click handler, On Unload handler, On Load handler and other handlers. When a particular event is detected, the corresponding handler can execute code inserted by the performance monitoring code. As a result, the code in the event handler may retrieve and store a time associated with an event, store information on the client, retrieve information from client files, send information over a network, or perform some other operation. Operation of performance monitoring code is discussed in more detail below.

The response time associated with a content request made to an application server by a client device can be determined in several ways. In one embodiment, the response time can be determined by events occurring at a client device. In this case, the response time can be calculated as the difference between the time user input is received by a browser application at the client device and the time that loading of the content (associated with the user input) within the browser application is complete. In another embodiment, the response time may be determined by events occurring at an application server. In this case, the response time may be determined by the difference between the time the request is received by the application server and the time a content page load confirmation message is received by the application server. Determining which method to use (i.e., using client device events or application server events) may depend on availability of timing information from each machine, the difference in the calculated response time between the two methods, or other information. Determining the response time associated with a content request from a client device to an application server is discussed in more detail below.

In one embodiment, the technology herein can be used to generate a filter (such as servlet filter) within an application on an application server using bytecode instrumentation. The technology herein may also be used to access information from the particular application. To generate the filter, an application management tool may instrument the application's object code (also called bytecode). FIG. 1A depicts an exemplar process for modifying an application's bytecode. FIG. 1A shows Application 2, Probe Builder 4, Application 6 and Agent 8. Application 6 includes probes used to access information from the application, and application 2 is the application before the probes are added. Application 2 can be a Java application or a different type of application.

Probe Builder 4 instruments (e.g. modifies) the bytecode for Application 2 to add probes and additional code to Application 2 in order to create Application 6. The probes may measure specific pieces of information about the application without changing the application's business logic. Probe Builder 4 also generates Agent 8. Agent 8 may be installed on the same machine as Application 6 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 1B:
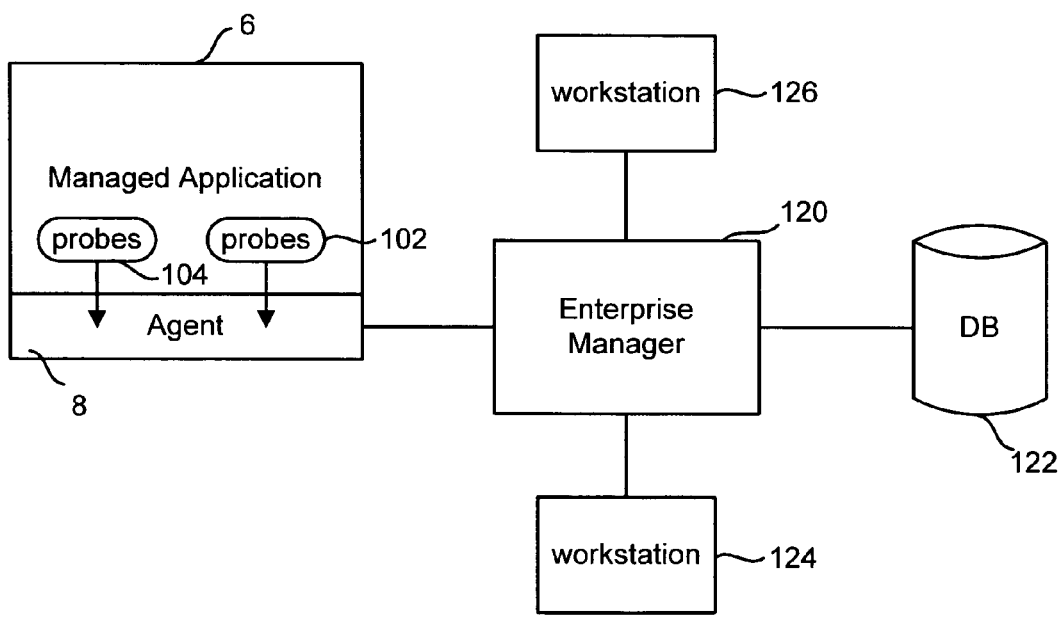
FIG. 1B is a block diagram of a system for monitoring an application.

FIG. 1B is a conceptual view of the components of the application performance management tool. In addition to managed Application 6 with probes 102 and 104, FIG. 1B also depicts Enterprise Manager 120, database 122, workstation 124 and workstation 126. As a managed application runs, probes (e.g. 102 and/or 104) relay data to Agent 8. In one embodiment, probes 102 and 104 may be implemented at least in part by one or more filters, such as a servlet filter. Servlet filters are discussed in more detail below. Agent 8 then collects and summarizes the data, and sends it to Enterprise Manager 120.

Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 1B, each of the components is running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 1C:
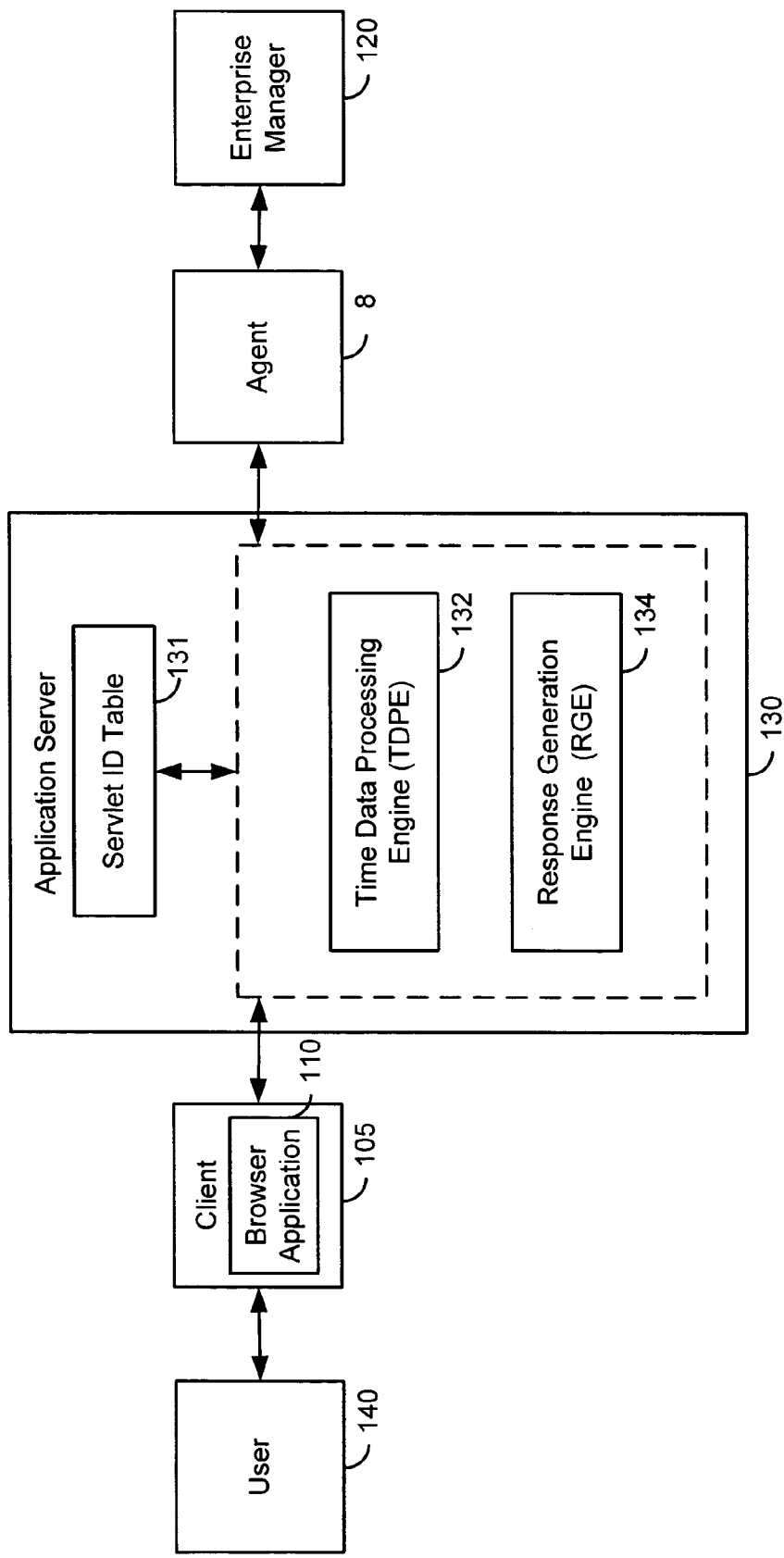
FIG. 1C illustrates an embodiment of a system for implementing the present invention.

FIG. 1C illustrates an embodiment of a system 128 that can provide the response time and other timing information discussed above. System 128 includes user 140, client 105, application server 130, agent 8, and enterprise manager 120. Client 105, which includes browser application 110, receives input from user 140. Application server 130 may include servlet identification table 131, time data processing engine (TDPE) 132, and response generation engine (RGE) 134. Application server 130 may communicate with client device 105 through a network, such as the Internet. Agent 8 may communicate with application server 130 and enterprise manager 120 via a LAN or other suitable means.

Browser application 110 resides and is executed on client device 105. User 140 may provide input through a user interface provided by browser application 110. In one embodiment, browser application 110 is stored in memory of client device 105. The browser may provide content derived from data received from application server 130.

Application server 130 provides a web service accessible by browser application 110 residing on client device 105. Servlet identification table 131 comprises servlet identification information and corresponding unique identifiers for requests received by application server 130. This is discussed in more detail with respect to FIG. 5B below. The table information is used to store information regarding which servlet generated a particular content response. TDPE 132 determines time information from events detected by application server 130 and data received from client device 105. RGE 134 generates a response to the content request received from the client. Determination of time information and generation of a response are discussed in more detail below.

Agent 8 receives time data from application server 130. The time data is then sorted, aggregated and provided to enterprise manager 120. This is discussed in more detail with respect to FIGS. 4B and 14 below. Enterprise manager 120 receives aggregated data from agent 8. The data is then provided to a system administrator, backend user, or other entity. The administrator, backend user, or other entity may analyze the data to determine strengths and weaknesses in the connection and response time between client device 105 and application server 130. For example, the data may be used to determine if the service is working properly (e.g., is fast enough).

Figure 1D:
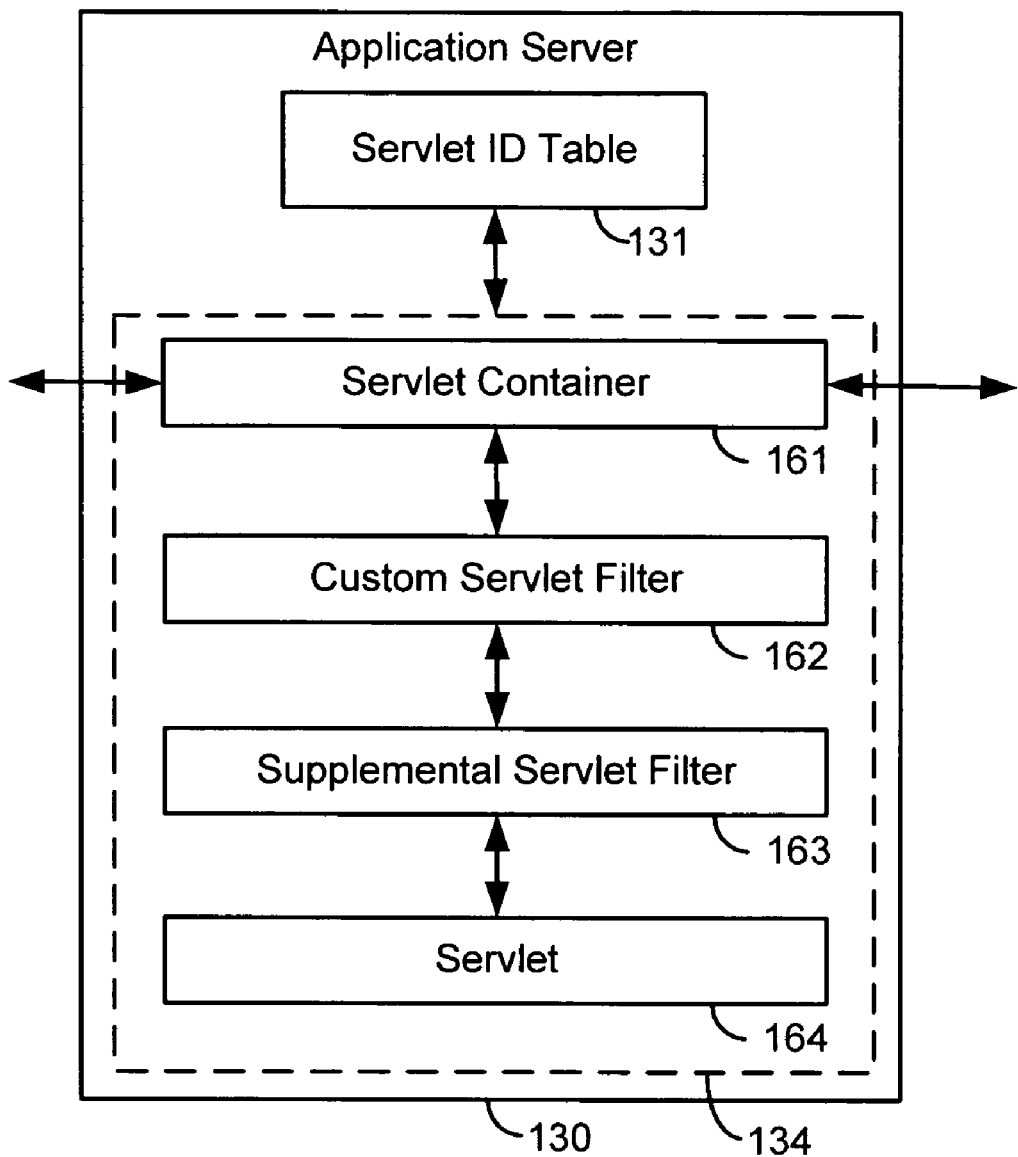
FIG. 1D illustrates an embodiment of an application server.

FIG. 1D illustrates an embodiment of application server 130 of FIG. 1C. Application server 130 includes server identification table 131 and RGE 134 (TDPE not shown for purposes of simplification only). RGE 134 includes servlet container 161, custom servlet filter 162, supplemental servlet filter 163, and servlet 164.

Servlet container 161 is a servlet engine able to provide servlet functionality. Servlet container 161 manages servlets, such as servlet 164, and determines which servlet to invoke for an incoming request. For example, servlet container 161 may receive a request and route the request to servlet 164. Operation of servlet container 161 is discussed in more detail below.

One or more custom servlet filters, such as custom servlet filter 162, may be implemented in RGE 134. Custom servlet filter 162 can intercept and process a request and/or response sent to or from servlet 164. In particular, custom servlet filter 162 may transform the header and body data in a content request or response. The code comprising custom servlet filter 162 can transform the body and header information of a request or response. In some cases, a custom servlet filter can be added to a servlet container by modifying an application configuration file. Initialization, instantiation, and operation of custom servlet filter 162 are discussed in more detail below.

One or more servlet filters, such as servlet filter 163, may be implemented in RGE 134. Supplemental servlet filter 163 is a servlet filter similar to custom servlet filter 162. However, supplemental servlet filter 163 is typically already configured and installed on application server 130. Thus, data need not be separately added to a configuration file to initialize a supplemental servlet filter.

One or more servlets, such as servlet 164, may be implemented in RGE 134. In one embodiment, a servlet is a component that generates dynamic content. Servlet 164 is an example of a component that generates a response associated with a content request. In one embodiment, servlet 164 can be a Java technology based web component. In another embodiment, servlet 164 may be implemented in some other technology. Operation of a servlet is discussed in more detail below.

Figure 2:
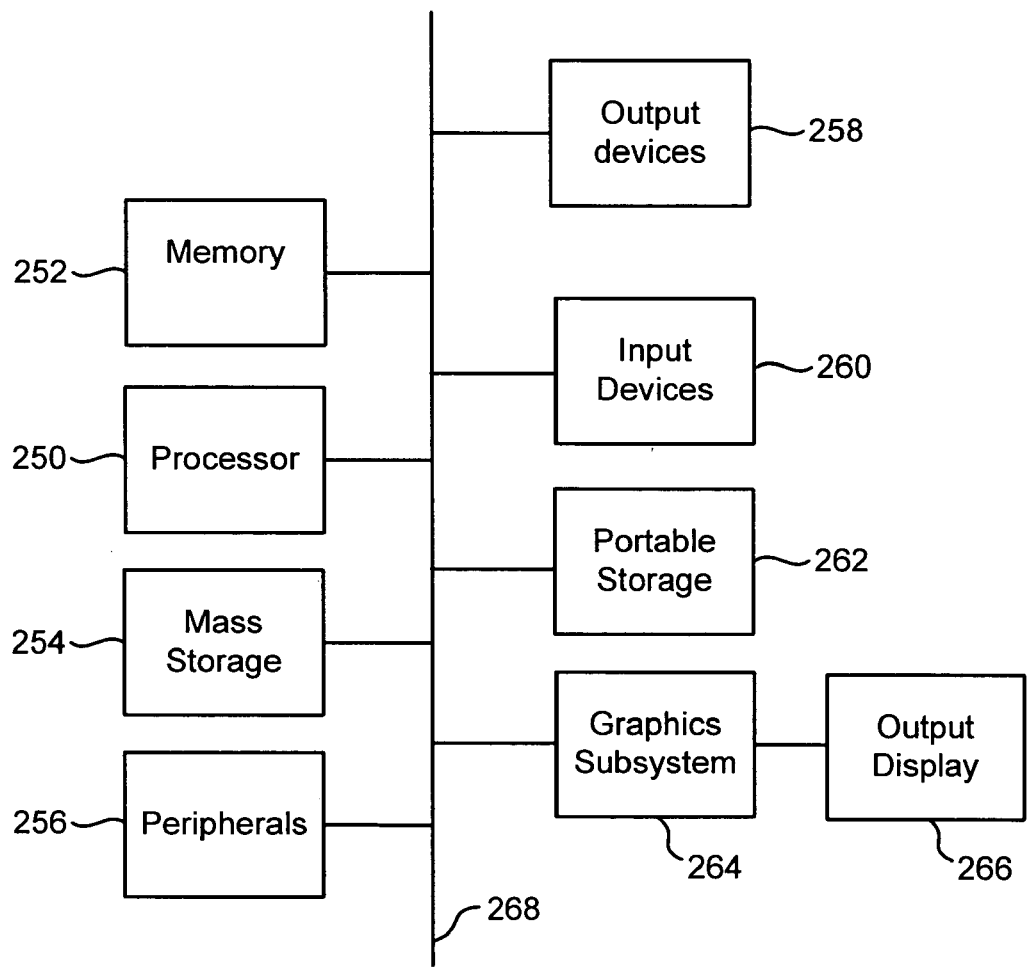
FIG. 2 illustrates a computing system in which the system of the present invention may be implemented.

FIG. 2 illustrates an embodiment of a computing system 200. In one embodiment, system 200 may be used to implement application server 130, client device 105, agent 8, and/or enterprise manager 120.

The computer system of FIG. 2 includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2 further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2 are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2 includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2 includes output devices 258. Examples of suitable output devices include speakers, printers, network interfaces, monitors, etc.

The components contained in the computer system of FIG. 2 are those typically found in computer systems suitable for use with the present invention, and are intended to represent a broad category of such computer components that are well known in the art. Thus, the computer system of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3A:
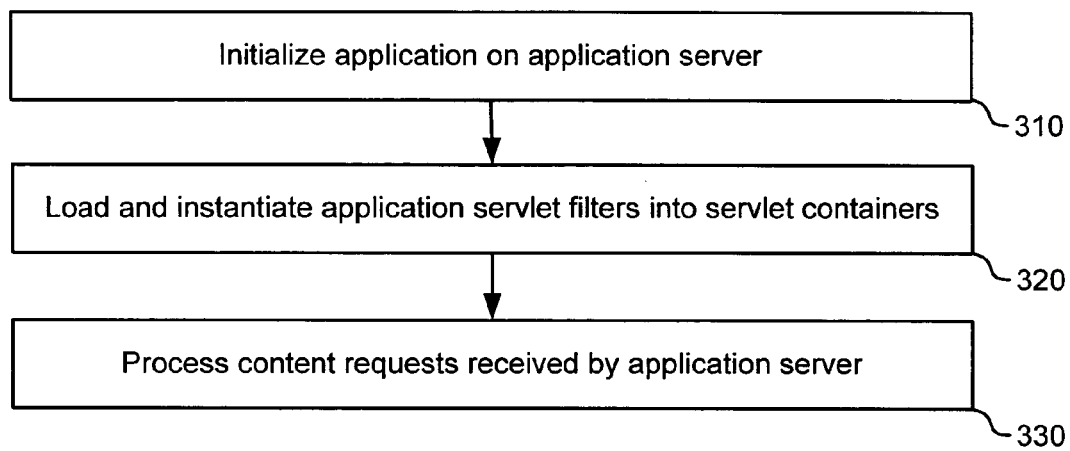
FIG. 3A illustrates an embodiment of a flowchart for configuring an application server to process content requests.

FIG. 3A illustrates an embodiment of a method for configuring application server 130 to process content requests. An application on application server 130 is initialized at step 310. Application servlet filters are loaded and instantiated into servlet containers at step 320. Custom servlet filter 162 is included in the servlet filters to be loaded and instantiated. In one embodiment, custom servlet filter 162 can be added to a configuration file in order for the filter to be loaded and instantiated with the other servlet filters. The loading and instantiating is performed by servlet container 161. Next, content requests received by an application are processed at step 330. This is discussed in more detail in FIGS. 4A-4B below. Steps 310-320 are discussed in more detail with respect to FIG. 3B below.

Figure 3B:
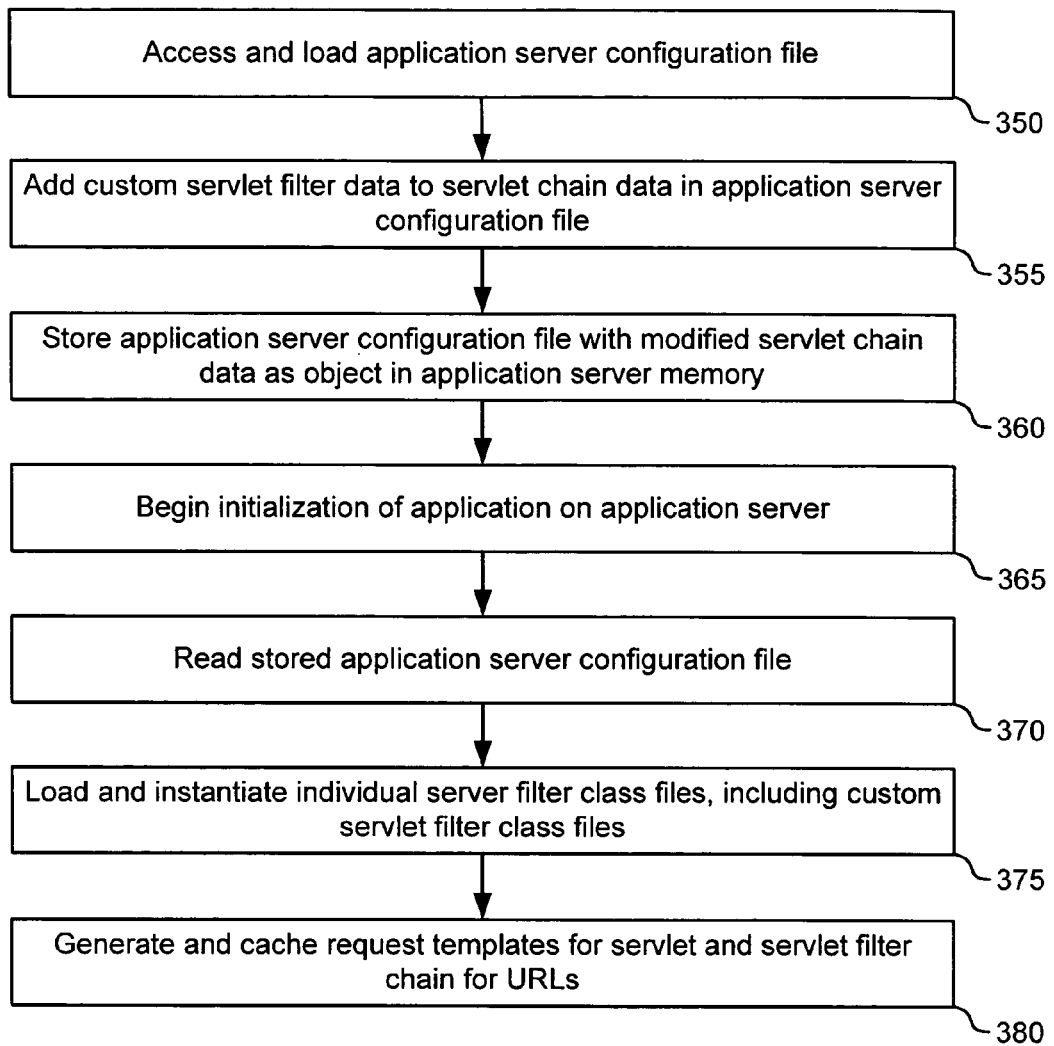
FIG. 3B illustrates an embodiment of a flowchart for loading and instantiating application servlet filters.

FIG. 3B illustrates an embodiment of a method 340 for loading and instantiating application servlet filters. Method 340 provides more detail for step 320 of method 300 in FIG. 3A. An application server configuration file is accessed and loaded at step 350. In one embodiment, the configuration file is accessed to determine the current servlet filters associated with the application servlet container. Once the current servlet filters are determined, additional servlet filters can be added into the servlet filter chain. Custom servlet filter data is added to servlet filter chain data in the application server configuration file at step 355. In one embodiment, the custom servlet data is added to a configuration file entitled, "web.xml" of the application server. The added data is used to subsequently load and instantiate custom servlet filters. The custom servlet filter data has the same format as existing servlet filters. For example, the custom servlet filter data includes header information and body information. In one embodiment, the custom servlet filter data is added such that custom servlet filter 162 is the first to process a content request for a servlet and last to process an outgoing content response from a servlet. This is illustrated in FIG. 1D. Once information for additional servlet filters is added, an application server will interpret the custom servlet filter data as a normal servlet filter data within the application server configuration file.

The application server configuration file with modified servlet chain data is stored as an object in the application server memory at step 360. This modified configuration file replaces the original application server configuration file accessed at step 350.

Initialization of the application on the application server begins at step 365. This can be performed by servlet container 161. In one embodiment, step 365 is performed at startup of the application server or the servlet engine of the servlet container. Next, the stored application server configuration file is read at step 370. The configuration file may be read by servlet container 161 in preparation for instantiating servlets and servlet filters. Individual servlet filter class files are then loaded and instantiated at step 375. The individual servlet filter class files may include both custom servlet class files (for example, class files for custom servlet filter 162) and pre-existing servlet class files (such as class files for supplemental servlet filter 163). This creates a data structure of servlet filters which will be used to process incoming content requests. Next, request templates for a servlet and servlet filter chains are generated and cached at step 380. Templates consisting of a chain of processing servlet filters and servlets are generated for particular URLs. For example, a different chain of servlet filters and servlets may be used to process requests from different URLs. Each request template may specify a chain for one or more URLs.

In one embodiment, method 340 may be performed for application servers within a WebLogic application server architecture. WebLogic is provided by BEA Systems, of San Jose, Calif. In another embodiment, method 340 may be performed for application servers implemented within a WebSphere application server architecture. WebSphere is provided by IBM, of San Jose, Calif. For WebSphere application servers, method 340 can be altered slightly because a servlet filter chain is maintained outside a server configuration file. In this case, the servlet filter chain is modified rather than an application server configuration file. Otherwise, method 340 is generally applicable to both application server architecture systems, as well as other systems.

FIG. 4 illustrates an embodiment of a sequence diagram for the present invention. Sequence diagram 400 illustrates communications between user 105, browser application 110, application server 130, agent 8, and enterprise manager 120. In one embodiment, the communications are initiated by a user selection of a content page element provided by browser application 110. In response to receiving the user selection, browser application 110 retrieves content from application server 130. The content is in the form of a content response, and includes performance monitoring code. The performance monitoring code is loaded into browser application 110. When browser application 110 receives a subsequent user selection, a second content response is retrieved in response to the user selection. The performance monitoring code is able to capture timing information associated with the subsequent selection and the second content response. The captured timing information is then sent to application server 130 where it is processed further. The sequence diagram is discussed in more detail below.

Browser application 110 receives a user selection from user 140 as communication 401. The user selection may be associated with a content page element associated with an anchor, a form or some other element. In one embodiment, the selected element is associated with content available from application server 130. After receiving the user selection, browser application 110 transmits a content request to application server 130 as communication 402. In one embodiment, the content request may be an HTTP request. Next, application server 130 receives and processes the content request and generates a content response. In one embodiment, performance monitoring code is included in the response generated as a result of the content request. The code may be implemented as JavaScript or some other type of code. The content response is transmitted to browser application 110 as communication 403. The application server processing time can be measured as the time difference between the time application server 130 receives the content request and the time application server 130 transmits the content response. The application server processing time (and other time information discussed in more detail below) may be sent to Agent 8 as part of communication 405.

Browser application 110 receives the content response and extracts the performance monitoring code and content data from the response. The performance monitoring code is registered with browser application 110 and executed. While executing the performance monitoring code, browser application 110 also loads the extracted content a user interface. Once the content is loaded, browser application 110 transmits a content load complete message to application server 130 as communication 404. After receiving the content load complete message, application server 130 processes time information captured at the server and sends the processed time information to agent 8 as communication 405.

At some point after receiving the content response as communication 403, browser application 110 may receive a subsequent user selection as communication 410. Similar to the selection received as communication 401, the subsequent user selection may be a selection of a content page anchor element, form element or some other element. The performance monitoring code stores timing information associated with the received user selection as communication 411 and sends a content request to application server 130 as communication 412. Application server receives the content request, generates a content response, and sends the content response to browser application 110 as communication 413. Browser application receives the content response and stores timing information associated with the response at communication 414. After receiving the response, browser application loads content from the response into an interface. In response to loading the content, browser application 110 sends a content load complete message to application server 130 as communication 415. The content load complete message includes timing information captured by the performance monitoring code at browser application 110. Application server 130 processes the received timing information and sends the processed timing information to agent 8 as communication 416. Agent 8 then transmits aggregated processed timing information to enterprise manager 120 as communication 417.

Figure 5:
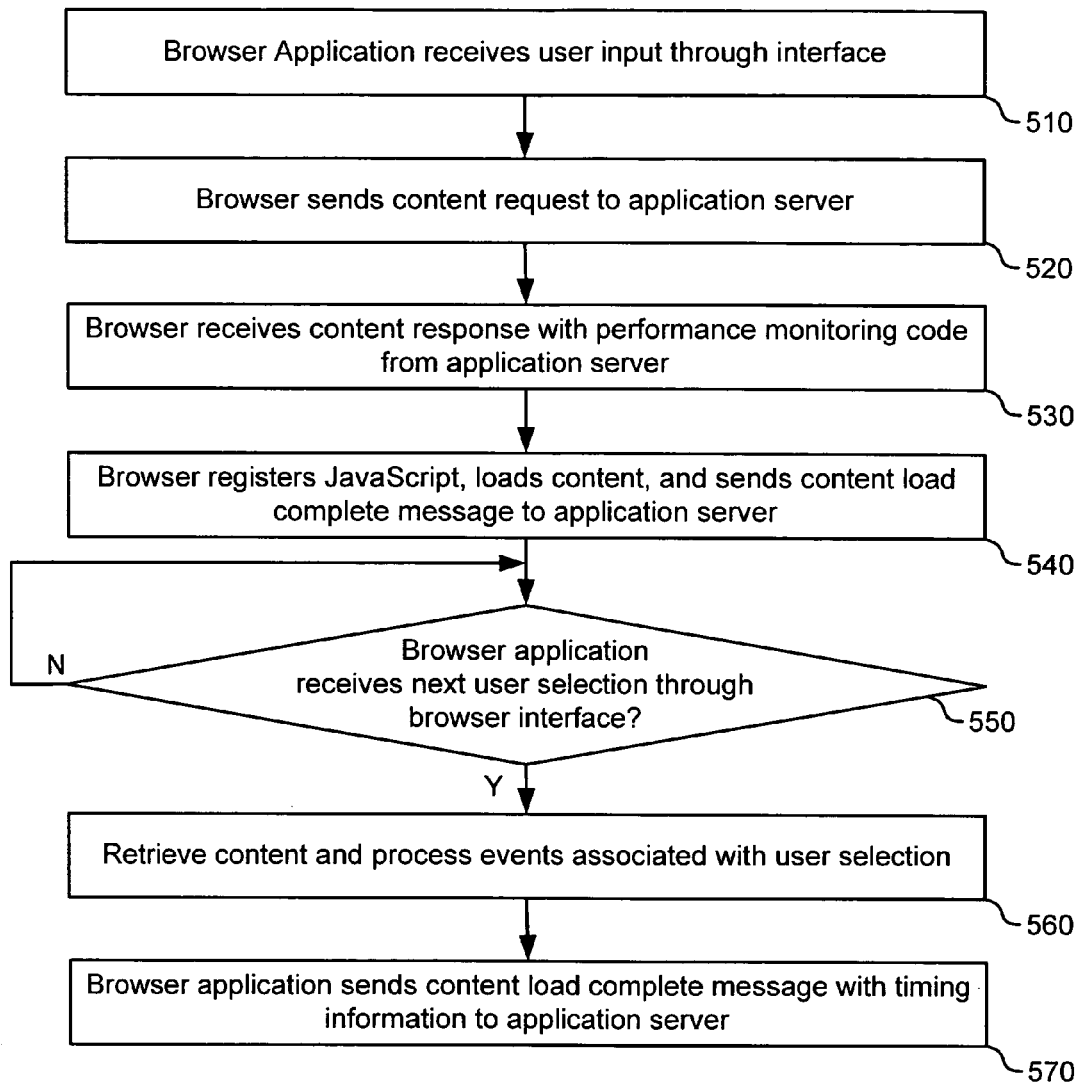
FIG. 5 illustrates an embodiment of a flowchart for client-side actions performed to monitor application performance.

The entities implementing the present technology and the communications between those entities are discussed in more detail below. In particular, the portion of the present technology implemented at client device 105 by browser application 110 is discussed with respect to FIGS. 5-12. FIG. 5 is a flowchart illustrating client side actions performed by browser application 110 and performance monitoring code executed at the browser. The client side actions are performed during the process of monitoring a web service provided over a network. FIGS. 6-11 provide more detail for the flow chart of FIG. 5. The portion of the present technology implemented at application server 130 is discussed with respect to FIGS. 13-20. FIG. 13 provides a flowchart illustrating server side actions performed by application server 130 while monitoring a web service provided over a network. FIGS. 14-21 provide more detail for the flow chart of FIG. 13.

FIG. 5 illustrates a flowchart of an embodiment for the client-side actions performed in monitoring a web service. With respect to the sequence diagram of FIG. 4, the flowchart of FIG. 5 provides more detail for the steps performed by browser application 110 and performance monitoring code at browser application 110. The flowchart of FIG. 5 begins with browser application 110 receiving user input through an interface at step 510. The interface is provided by browser application 110. The input received through the interface can include a selection of an anchor element, selection of a form, selection of other page content or some other input. Selection of anchor elements and form elements is discussed in more detail below with respect to FIG. 9.

After receiving user input, browser application 110 sends a content request to application server 130 at step 520. In one embodiment, the content request is sent to application server 130 in response to receiving user input at step 510. For example, the user input may select a hyperlink which requires a resource or other content to be retrieved from application server 130. Browser application 110 may then generate a content request to retrieve the resource. After sending the content request, browser application 110 receives a content response containing performance monitoring code from application server 130 at step 530. In one embodiment, application server 130 generates the content response after receiving the content request from browser application 110. Generation of the response by application server 130 is discussed in more detail with respect to FIGS. 13-16 below.

After receiving the response, browser application 130 retrieves browser content and the performance monitoring code from the response, registers the performance monitoring code with browser application 110, loads browser content into the browser application and sends a content load complete message to application server 130 at step 540.

In one embodiment, registering the performance monitoring code at step 540 includes registering code with event handlers in browser application 110. The event handlers may include an On Click event handler, On Unload event handler, On Load event handler, and other handlers. Registration of code with event handlers is discussed in more detail below with respect to FIG. 6. In response to loading content from the first content response received by browser application 110, code registered with the On Load handler may send a content load complete message to application server 130. The content load complete message signals application server 130 that the content has been completely loaded within browser application 130. In one embodiment, the content load complete message sent at step 540 will not include timing information associated with the response. In some cases, the content load complete message sent at step 540 may include identification information for the content response received at step 530. The identification information is retrieved from the content response by browser application 110.

After loading the content of the content response received at step 540, a determination is made as to whether a user selection is received through browser application 110 at step 550. Browser application 130 may receive the user selection through an interface provided by browser application 110. Input received may be the same type of input as discussed above with respect to step 510. Receiving user input at step 550 is discussed in more detail below with respect to step 810 of FIG. 8 and the flowchart of FIG. 9. If the next user selection has not been received through browser application 110, operation of the flowchart of FIG. 5 remains at step 550 until the next user selection is received. Once the next user selection is received, content associated with the selection is retrieved and events associated with the user selection are processed at step 560. In one embodiment, the events processed may include an On Click event, an On Unload event, and other events associated with the user selection. Processing the events may include capturing the browser time and other information associated with each event. Retrieving content and processing events associated with a user selection received at step 550 is discussed in more detail below with respect to FIG. 8.

After retrieving content and processing events, browser application 130 sends a content load complete message having timing information to application server 130 at step 570. The message timing information may be sent in response to loading the content at step 560. In one embodiment, the timing information may include timing information stored in response to processing events associated with the user selection as well as other information. Transmitting timing information to application server 130 is discussed in more detail below with respect to step 890 of FIG. 8 and in the flow chart of FIG. 12. The handling of the timing information once it is received by application server 130 is discussed below with respect to step 1330 of FIG. 13.

Figure 6:
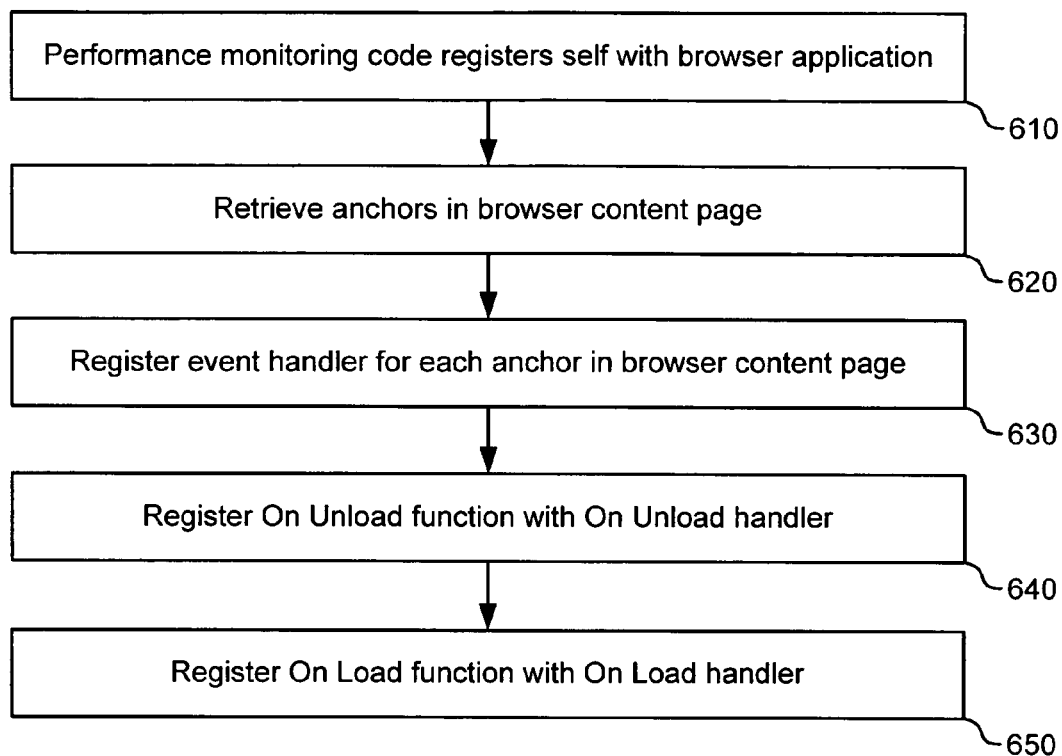
FIG. 6 illustrates an embodiment of a flowchart for registering performance monitoring code in a browser application.

As discussed above, when a browser application receives a first content response, performance monitoring code is registered with the browser application. The registered code can then capture timing information for events associated with subsequent user input and associated content requests and responses. FIG. 6 illustrates an embodiment of a flowchart for registering performance monitoring code in browser application 110. In one embodiment, the flowchart of FIG. 6 provides more detail for step 540 of FIG. 5 discussed above. The flowchart of FIG. 6 begins with performance monitoring code registering itself with browser application 110 at step 610. The code registers itself with browser application 110 so that the browser will be able to execute the code. When executed, the registered code will perform actions as discussed below with respect to steps 620-650.

After the performance monitoring code is registered with browser application 110, the code retrieves the anchors included in the HTML of the browser content page provided by browser application 110 at step 620. In this case, the code may request a list of all the anchors contained in the provided content page from browser application 110.

An event handler is then registered for each anchor in the content page at step 630. Registering an event handler for each anchor in the page may include registering code that will store the current browser time and the selected URL associated with the anchor upon detecting a user selection of the anchor. The browser time and URL may be stored in one or more data files, cookies or in some other format on the client or some other location. In one embodiment, the browser time and URL are stored in separate cookies on client 105 by browser application 110. Next, an On Unload function is registered with an On Unload handler at step 640. When executed upon detection of an On Unload event, the On Unload handler function may store the current browser time in a data file, browser cookie file or some other file. In some cases, an On Unload handler may already be configured for a content page. In this case, the On Unload function to be registered with the existing On Unload handler may have to be chained with the existing handler code. This is discussed in more detail below with respect to the flowchart of FIG. 7. Next, an On Load function is registered with an On Load handler at step 650. The On Load function registered with the On Load handler may gather stored and other timing information and transmit the timing information and other data as a content load complete message. Operation of an On Load function is discussed in more detail with respect to step 890 in FIG. 8 and the flow chart of FIG. 12. Registration of the On Load function may be performed similarly to registering the On Unload function with an On Unload handler at step 640. After registering the function with an On Load handler, registration of the performance monitoring code is complete.

Figure 7:
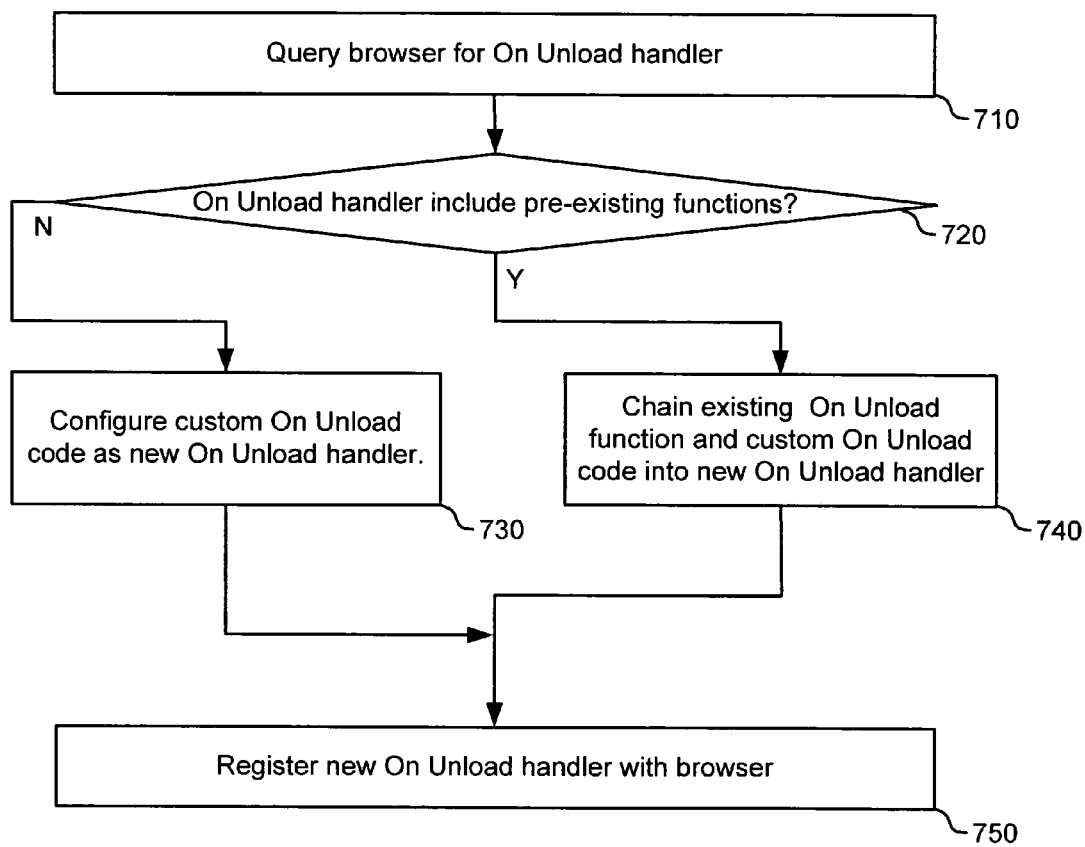
FIG. 7 illustrates an embodiment of a flowchart for registering code within an event handler.

FIG. 7 illustrates a flowchart for registering code with an event handler. In one embodiment, the flowchart of FIG. 7 provides more detail for step 640 of FIG. 6. The flowchart of FIG. 7 may also be applied to register an On Load function with an On Load handler as in step 650 of FIG. 6 or any other function or code within an event handler. First, performance monitoring code executed by browser application 110 queries browser application 110 for a preexisting On Unload event handler at step 710. A determination is made at step 720 as to whether any preexisting On Unload handler exists. The response by browser application 110 to the query at step 710 will indicate if a preexisting On Unload handler exists. If a preexisting On Unload handler exists, operation continues in step 740. If a preexisting On Unload handler does not exist, operation continues to step 730.

When an On Unload handler is determined to not already exist, an On Unload function is configured as the new On Unload handler at step 730. Operation then continues to step 750. If an On Unload handler already exists, the new On Unload function is chained together with the existing On Unload handler code at step 740. In one embodiment, the new On Unload function is set to be executed before the existing On Unload code in the On Unload event handler. As a result, the new On Unload code may retrieve the current browser time as soon as possible after page content is actually unloaded from browser application 110 and an On Unload event is detected. Next, the new On Unload handler is registered with browser application 110 at step 750. After registering the On Unload event handler, the handler is ready to be processed upon detecting an On Unload event.

Figure 8:
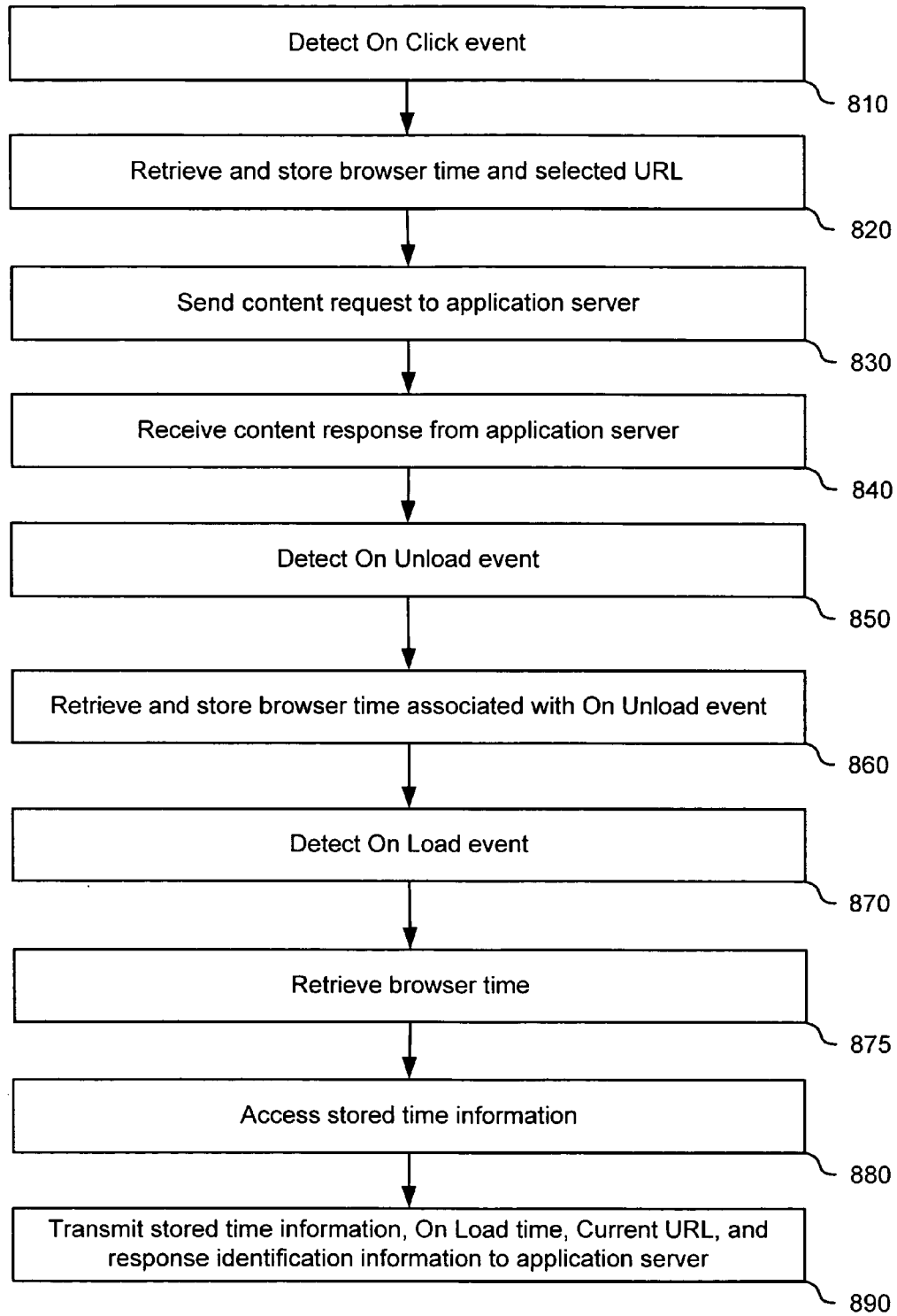
FIG. 8 illustrates an embodiment of a flowchart for retrieving content and processing events associated with a user selection.

After the performance monitoring code has registered with browser application 110 and a new user input is received at step 550 of FIG. 5, content associated with the user input is retrieved and events associated with the user input, content request and content response are processed. FIG. 8 illustrates an embodiment of a flowchart for retrieving content and processing events associated with a user selection at browser application 110. In one embodiment, the flowchart of FIG. 8 provides more detail for step 560 of FIG. 5. First, an On Click event is detected at step 810. In one embodiment, the On Click event may be associated with the selection of an anchor element, a form element, or some other element within a content page provided by browser application 110.

Next, the browser-now time and the selected URL associated with the On Click event are stored at step 820. In one embodiment, the browser now time and URL associated with the On Click event are retrieved from browser application 110 by code within the On Click event handler. The On Click event handler may store the URL and browser time in separate files. The files may be locally stored data files, browser cookie files, or other files. In one embodiment, the file in which the information is stored may also include information identifying the type of data stored in that file. For example, the URL may be stored in a browser cookie file titled "companyname_selectedURL_<URL>". Step 820 is discussed in more detail below with respect to FIG. 9.

A content request is sent to application server 130 at step 830. The content request is sent in response to receiving user input at step 550 of FIG. 5. Next, a content response is received from application server 130 at step 840. In one embodiment, the content response is generated by application server 130 in response to the content request. The content response may include identification information. The identification information is assigned to the response by application server 130 and can be stored in a local file by the performance monitoring code. After the content response is received, the current content provided in browser application 110 is unloaded and an On Unload event is detected at step 850. After the On Unload event is detected, the current browser time associated with the On Unload event is retrieved and stored at step 860. The browser time associated with the On Unload event may be retrieved from browser application 110 by code in an On Unload event handler. After retrieving the current time, the time is stored in a file. In one embodiment, the time is stored in a browser cookie file, a data file on client 105 or some other file.

After unloading the currently displayed content, browser application 110 loads the content of the received content response into the interface provided by browser application 110. Once the content is completely loaded in the browser application interface, an On Load event is detected at step 870. After detecting the On Unload event, the current browser time is retrieved at step 875. In one embodiment, code within an On Load event handler retrieves the current time from browser application 110. After retrieving the current browser time, stored time information is accessed at step 880. The stored time information may include On Click data, On Unload data, selected URL data, response identification information and other data. In one embodiment, the stored time information is retrieved from data files, cookies or other files accessible by browser application 110. After accessing the stored time information, the stored time information, the On Load time associated with the On Load event and the current URL are transmitted to application server 130 at step 890. The time information is sent as a content load complete message and may be used to determine time information metrics by application server 130.

When receiving user input at step 510 of FIG. 5, the different content types that may be selected by a user include a hyperlink, a form, or other content. At step 810 of FIG. 8, an On Click event is detected for the user selection. An On Click event may be triggered by a user selection of any content in a page provided by browser application 110. Thus, the On Click event may be triggered for both relevant selections of links and forms as well as irrelevant selections of non-selectable content (such as a background of a webpage.)

Figure 9:
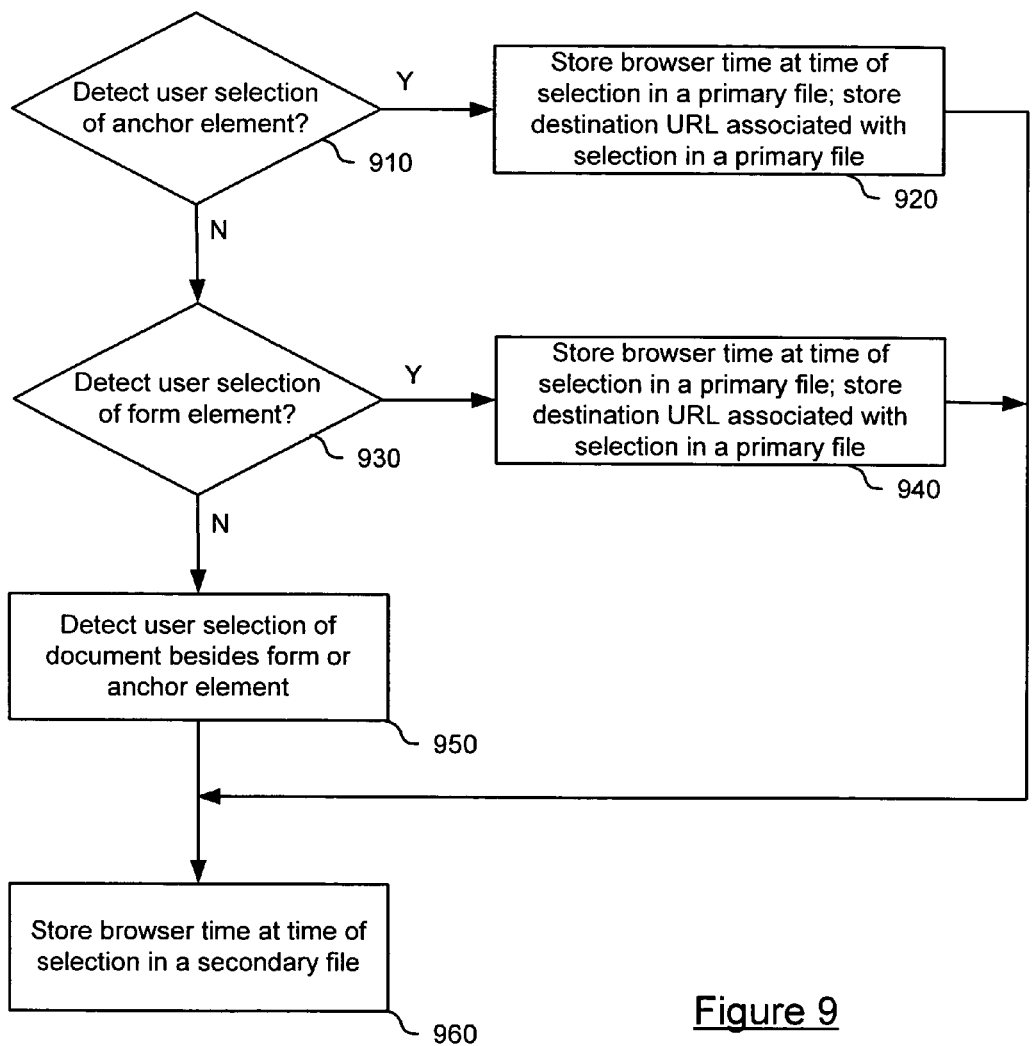
FIG. 9 illustrates an embodiment of a flowchart for storing time information in response to an On Click event.

Different data may be stored in response to determining the type of content selected by a user. FIG. 9 illustrates a flowchart of an embodiment for storing time information in response to an On Click event. In one embodiment, the flowchart at FIG. 9 provides more detail for step 820 of FIG. 8. After an On Click event is detected, a determination is made as to whether the user selection is associated with an anchor element at step 910. In one embodiment, the browser application can be queried to determine if the user selection is associated with an anchor element. In one embodiment, an anchor element is an element associated with a hyperlink. If the selection is associated with an anchor element, operation continues to step 920.

If the user selection is not associated with an anchor element, then the flowchart continues to step 930 where a determination is made as to whether the user selection is associated with a form element. Selecting a form element may include completing a form using a control mechanism. Control mechanisms may include buttons, check boxes, radio buttons, menus, text input, file selects, hidden controls, object controls or other controls. In some cases, a form control may be any input mechanism other than a selectable hyperlink provided in a webpage. If a determination is made at step 930 that the user selection involves a form element, operation continues to step 940. If a determination is made that the user selection does not involve a form element, operation continues to step 950.

At step 920, the browser time at the time of the selection of the anchor element is stored in a primary file. Additionally, the destination URL associated with the selection is stored in a separate primary file. In one embodiment, the primary files may be identified with a naming scheme indicating the file is a primary file (e.g., a file may be named "companyname_onclickprimary_url"). Operation of the flowchart of FIG. 9 then continues to step 960. At step 940, the browser time associated with the selection of the form element is stored in a primary file as well. Similar to step 920, a destination URL associated with the selection of the form element is also stored in a separate primary file. In one embodiment, the primary files containing the browser time and associated URL for a form element may be the same primary files used to store the corresponding information associated with a selected anchor element at step 920. After the browser time and destination URL are stored at step 940, flowchart of FIG. 9 continues to step 960.

A determination is made that the detected user selection is associated with an element of the document besides a form or anchor element at step 950. In this case, the user has selected or "clicked" an irrelevant part of the content page. (For example, the background of the page). Operation of the flowchart of FIG. 9 then continues to step 960 where the browser time associated with the user selection is stored in a secondary file at step 960. In one embodiment, the secondary file may be identified with a naming scheme indicating the file is a secondary file (e.g., a file may be named "companyname_onclicksecondary_url"). When a user selection associated with the On Click event is determined to be an irrelevant element of the content page as indicated at step 950, no primary files are stored and the browser time stored in the secondary file at step 960 can be used to determine timing information metrics. In cases where the browser time is stored in a secondary file after steps 920 and 940, the time is stored in the secondary file as a back-up mechanism for determining timing information metrics. In this case, the time stored in the primary and secondary files are the same. IN one embodiment, the primary and secondary files are browser cookie files, data files, or some other file. Determining timing information metrics from time information is discussed in more detail with respect to FIG. 18.

Figure 10:
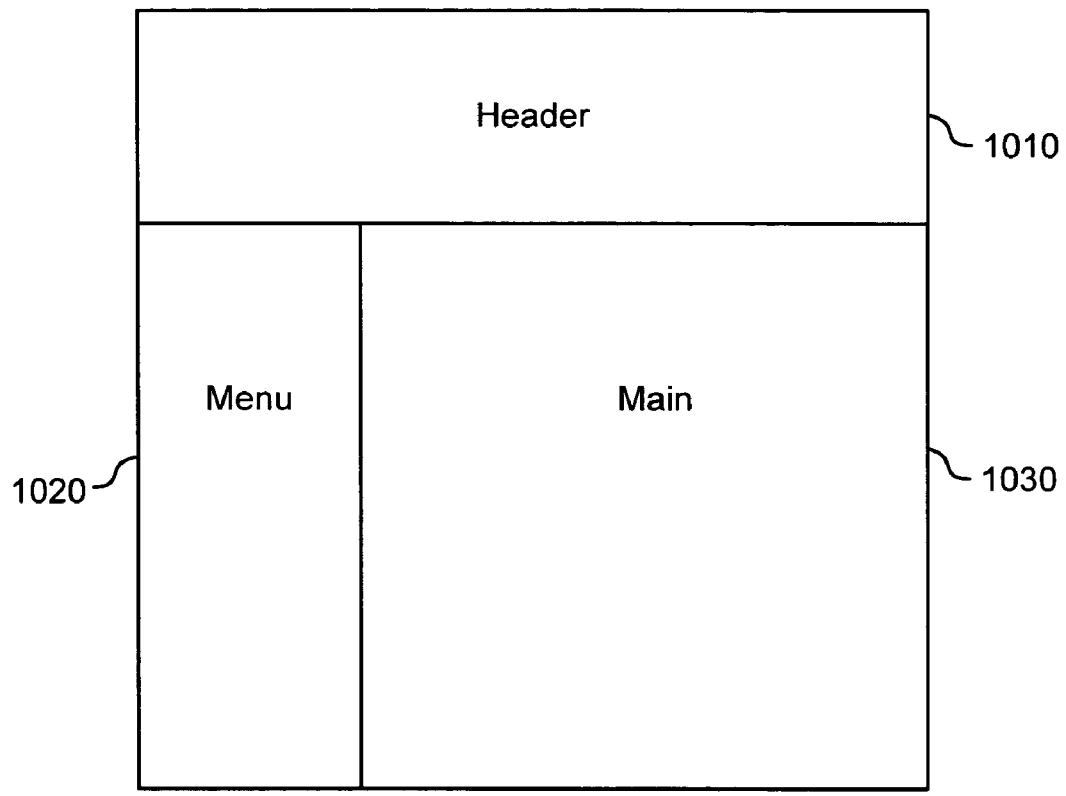
FIG. 10 illustrates an embodiment of a block diagram of a content page having frames.

In some cases, a user selection will initiate a single content request. This is discussed above with respect to FIG. 8. In other cases, a user selection may initiate more than one content request. This may be the case for browser content provided in frames. FIG. 10 illustrates an embodiment of a block diagram of a content page having multiple frames. The content page of FIG. 10 includes three frames. The three frames include a frame 1010, a frame 1020 and a frame 1030. Each frame may be associated with a target name. In FIG. 10, frame 1010 has a target name of "Header," frame 1020 has a target name of "Menu" and frame 1030 has a target name of "Main." In some embodiments, a single frame may be configured to send more than one content request in response to user input. In particular, a frame may initiate a content request for more than one frame within the content page. For example, if the content page of FIG. 10 is associated with an email interface, input received into "Menu" frame 1020 may trigger a content request for a list of emails for "Menu" frame 1020, inbox header content for "Header" frame 1010, and mail content for "Main" frame 1030. In any case, multiple On Unload events and On Load events may be associated with a single On Click event in a browser application providing a content page having frames.

Figure 11:
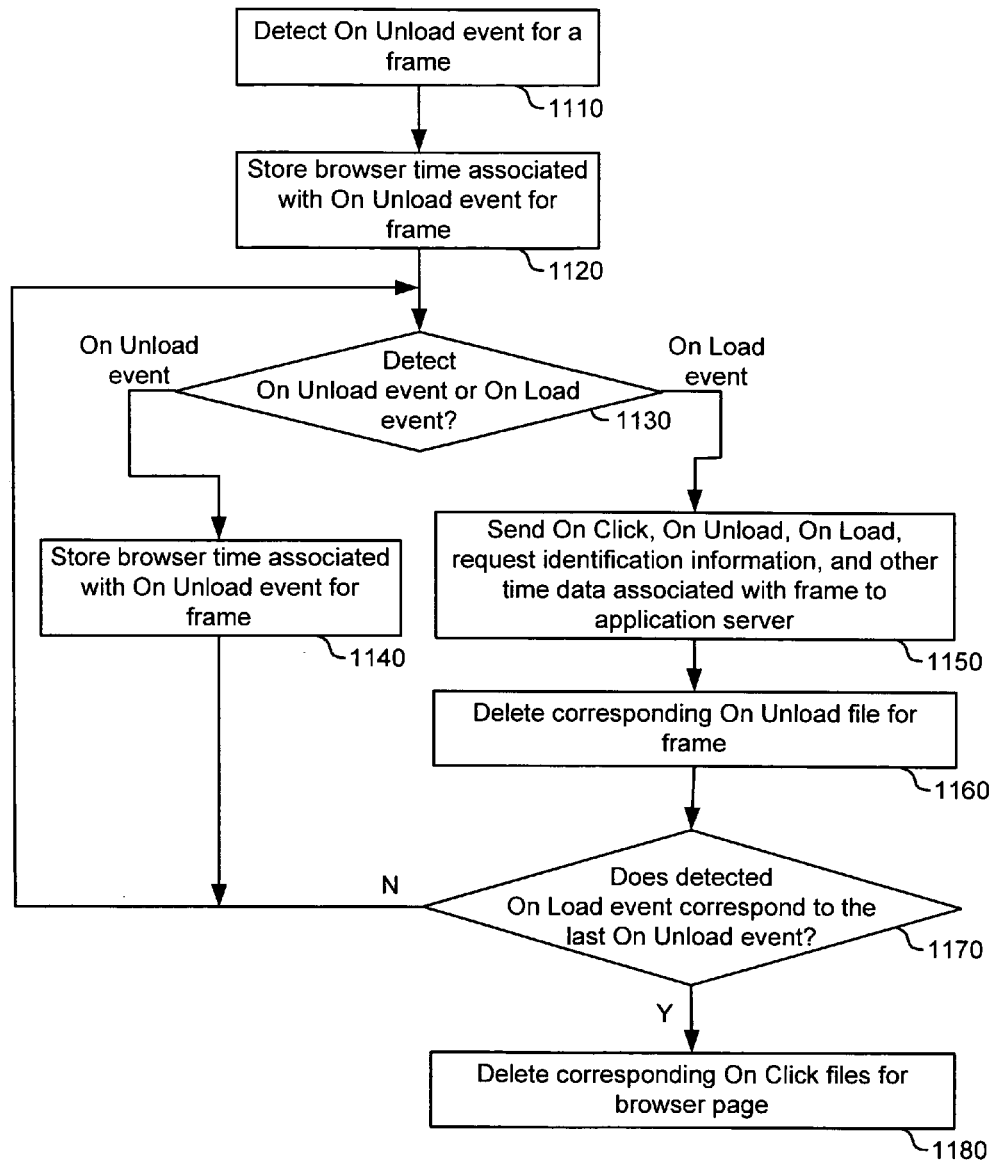
FIG. 11 illustrates an embodiment of a flowchart for processing events associated with a user selection of browser content having frames.

FIG. 11 illustrates a flowchart of an embodiment for processing timing events associated with content having frames. In one embodiment, the flowchart of FIG. 11 provides more detail of step 560 of FIG. 5 when browser application 110 provides content in frames. The flowchart of FIG. 11 begins with detecting an On Load event for a frame at step 1110. In one embodiment, after determining an On Click event has occurred and the first content response is received, an On Load event will occur before on On Load event occurs. Next, a browser time associated with the On Unload event for the particular frame is stored at step 1120. The current browser time may be stored by performance monitoring code configured to be executed in an On Unload event handler. In one embodiment, the name of the file having the information may include the target name for the frame. In some embodiments the file may be a cookie. For instance, a browser time associated with an On Unload event for "Menu" frame 1020 may be stored in a cookie entitled "company_unloadtime_menu". Next, a determination is made as to whether an On Load event or another On Unload event is detected at step 1130. If an On Unload event is detected, operation continues to step 1140. If an On Load event is detected, operation continues to step 1150. At step 1140, a browser time associated with the recently detected On Unload event for a particular frame is stored in a file associated with that frame. Again, the time may be stored by code in an On Unload event handler and have a name derived in part form the frame name. The current browser time may be stored by performance monitoring code configured to be executed in an On Unload event handler. After storing the browser time associated with an On Unload event for a frame, operation of the flowchart of FIG. 11 returns to step 1130.

When an On Load event is detected at step 1130, On Click data, On Unload data, On Load data, request identification information, selected URL, current URL and other time data associated with the frame are sent to application server 130 at step 1150. Performance monitoring code in an On Load handler may retrieve the stored data, current browser data, and other data and send the data. The On Click data associated with the On Load event is the same for all On Load events associated with a frame in the current content page. The On Unload data and On Unload data are associated with a particular frame. Request identification information is information included in the content response received by browser application 110. After the timing information associated with the frame is sent to application server 130, the corresponding file(s) containing the On Unload event data for the frame are deleted at step 1160. The file(s) can be deleted because they are not needed after the time information for the frame is transmitted to application server 130.

Next, a determination is made as to whether the detected On Load events correspond to the last On Unload event at step 1170. In one embodiment, the number of On Load events should equal the number of On Load events for a content page. An event handler may contain code which determines if there are any remaining files which contain On Unload event information associated with a frame in the current browser application. If the On Load event corresponds to the last On Unload event (e.g., no more On Unload files associated with the content page exist), the flowchart of FIG. 11 continues to step 1180. If the detected On Load event does not correspond to the last On Unload event, operation of the flowchart of FIG. 11 returns to step 1130 where the next On Load event or On Unload event is detected. If there are no more On Unload data files detected at step 1170, the corresponding On Click files associated with the browser page are deleted at step 1180.

Figure 12:
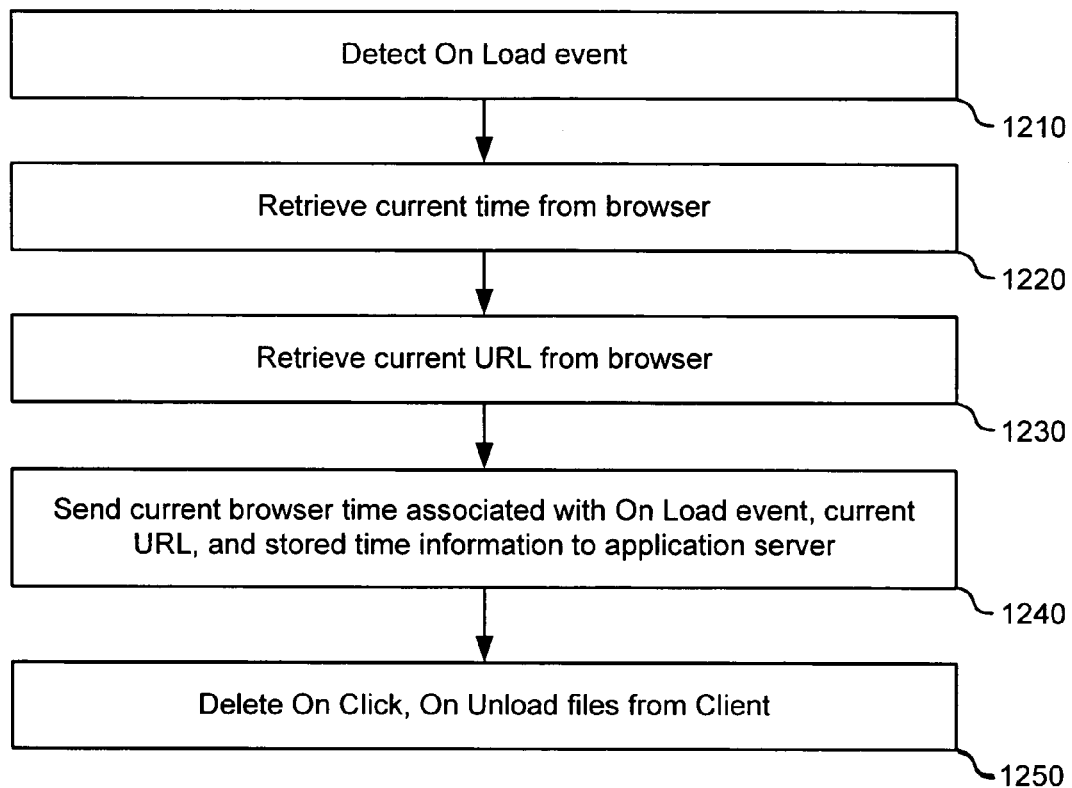
FIG. 12 illustrates an embodiment of a flowchart for sending timing information to an application server from a browser application.
Figure 13:
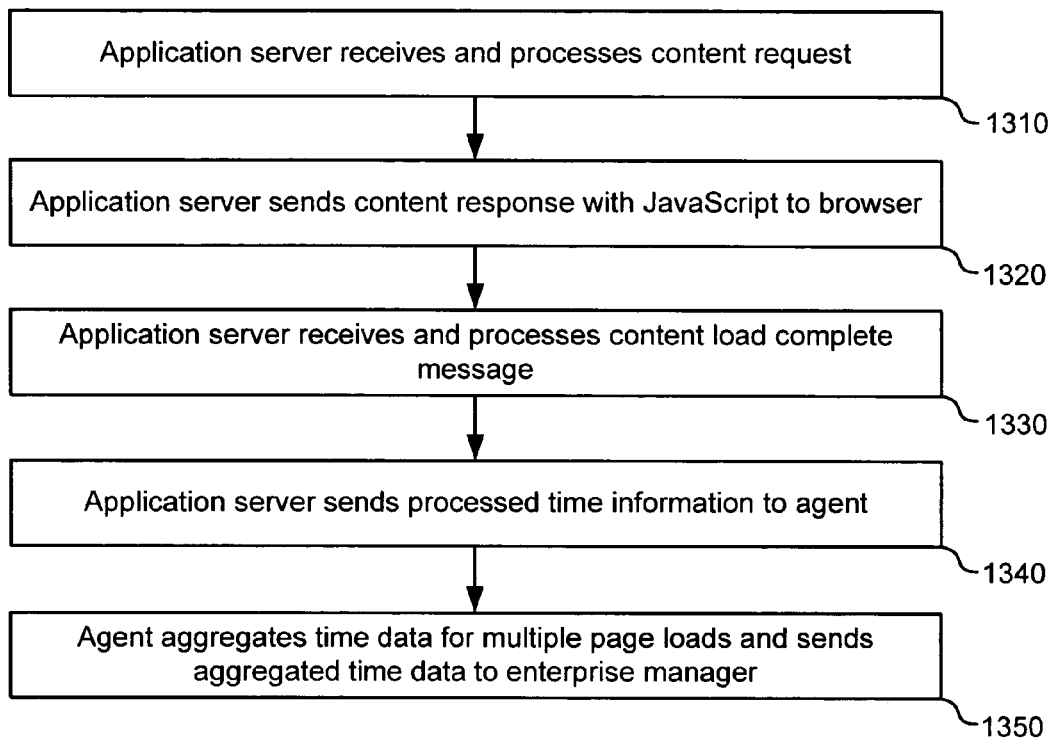
FIG. 13 illustrates an embodiment of a flowchart for server-side actions performed to monitor application performance.

FIG. 12 is a flowchart of an embodiment for sending time information to an application server. In one embodiment, the flowchart of FIG. 12 provides more detail for step 570 of FIG. 5. An On Load event is detected at step 1210. The On Load event may be detected by an On Unload handler within browser application 110. The current browser time is retrieved at step 1220. In one embodiment, the current browser time is retrieved from browser application 110 by On Load event handler code. Next, the current URL of the browser is retrieved at step 1230. The current URL may be retrieved from browser application 110 by On Load event handler code as well. After the current URL is retrieved, the current browser time, current URL, stored timing information and other information are sent to application server 130 at step 1240. In this case, the stored information may include a clicked URL, browser time associated with an On Click event, browser time associated with an On Unload event, response identification information, and other information. Code within the On Load event handler may retrieve the stored information and send all the timing information as a content load complete message. After sending the information, the On Click and On Unload files are deleted from client 105 at step 1250. Code within the On Load event handler may delete the files from client device 105.

As discussed above with respect to FIG. 4, application server 130 communicates with browser application 110 to monitor the performance of an application over a network. In particular, application server 130 may receive and process a content request sent by browser application 110, transmit performance monitoring code in a content response to browser application 110, receive content load complete messages from browser application 110 and process timing information. The timing information may be captured at browser application 110 by the performance monitoring code or at application server 130.

FIG. 13 is a flowchart illustrating the server side actions performed in the process of monitoring an application over a network. The flow chart of FIG. 13 provides detail for the operation of application server 130 of FIG. 1C-1D and FIG. 4. First, application server 130 receives and processes a content request at step 1310. The content request is received from browser application 110. Application server 130 processes the request using one or more servlet filters and a servlet. Processing by the servlet includes generating a content response. The content response may include content requested by browser application 110. Processing by the servlet filters may include adding performance monitoring code to the content response. Receiving and processing a content request by application server 130 is discussed in more detail below with respect to FIG. 14.

Application server 130 sends the content response to browser application 110 at step 1320. At some point after sending the content response, application server 130 receives and processes a content load complete message at step 1330. Processing the content load complete message may include determining the time the message was retrieved. In some instances, the content load complete message does not include time information. In some cases, processing the message may include retrieving time information from the message and determining timing information metrics from the timing information. The timing information metrics may include the response time for the content request, page loading time for the browser application, application server processing time, and other time information metrics associated with providing content to a user through browser application 110. Processing a received content load complete message is discussed in more detail below with respect to FIG. 17.

After processing time information in response to receiving the content load complete message, application server 130 sends the processed time information (for example, the timing information metrics) to agent 8 at step 1340. Agent 8 aggregates the processed time information associated with multiple content requests and sends the aggregated processed time information to enterprise manager 120 at step 1350. In one embodiment, more than one set of processed time information may be sent to agent 8 before agent 8 sends the aggregated information to enterprise manager 120. For example, steps 1310-1340 may be performed more than once before step 1350 is performed. In one embodiment, enterprise manager 120 can be used to view and analyze data by an administrator or a user of a backend monitoring service. This is discussed in more detail below with respect to FIG. 21.

Figure 14:
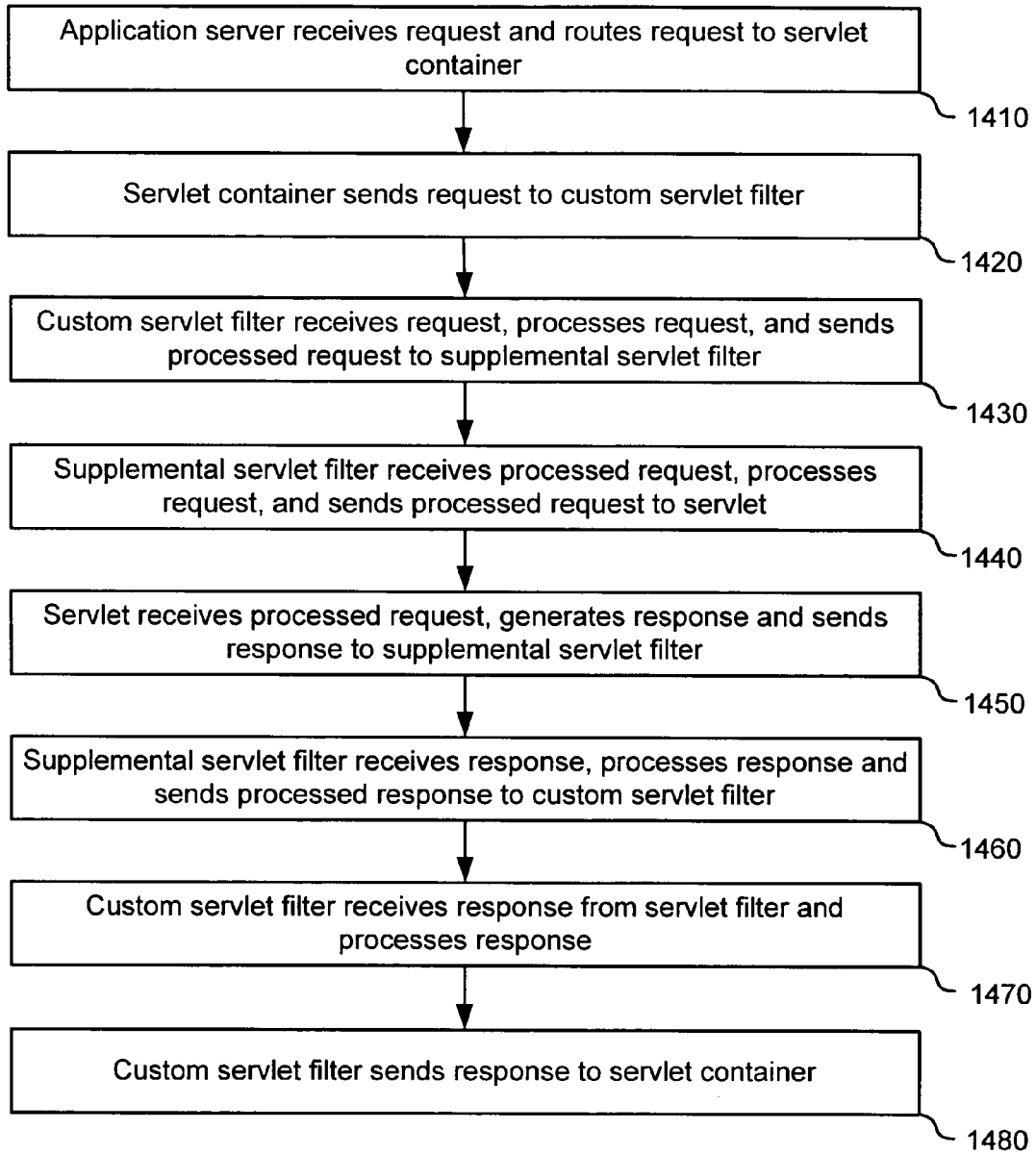
FIG. 14 illustrates an embodiment of a flowchart for processing a content request by an application server.

FIG. 14 illustrates a flowchart of an embodiment for processing a content request by an application server. The flowchart of FIG. 14 provides more detail for step 1310 of the flowchart of FIG. 13. The flowchart of FIG. 14 begins with application server 130 receiving a request and routing the request to servlet container 161 at step 1410. Next, servlet container 161 sends the request to custom servlet filter 162 at step 1420. Before sending the request, servlet container 161 determines the appropriate servlet to process the response. In one embodiment, servlet container 161 maintains templates for URLs that determine the chain of servlet filters and servlets to route requests to. To send the request, servlet container 161 calls custom servlet filter 162 with a request object and response object. The response object may be in the form of a response template generated by servlet container 161.

Next, custom servlet filter 162 receives the request from servlet container 161, processes the request and sends the processed request to supplemental servlet filter 163 at step 1430. In one embodiment, processing of the request by custom servlet filter 162 includes assigning a unique identification number to the request. The request unique identification number and servlet identification information used to process the request is stored in servlet identification table 131. Servlet identification table 131 is discussed in more detail with respect to FIG. 15. In another embodiment, custom servlet filter 162 may wrap the response object in a wrapper. The response object wrapper may be used to detect communications made to and from the response. For example, the wrapper may detect what mechanism is used to generate the body of the response and subsequently provide that information to a requesting entity. This is discussed in more detail below with respect to FIG. 16.

Supplemental servlet filter 163 receives the content request from custom servlet filter 162, processes the request if needed, and sends the content request to servlet 164 at step 1440. Supplemental servlet filter 163 can perform any needed action to the response object before providing the response to servlet 164. For example, supplemental servlet filter 163 may be used to change an image within the request from one format to another format within the response.

Servlet 164 receives the content request from supplemental servlet filter 163, generates a content response, and sends the response to supplemental servlet filter 163 at step 1450. Servlet 164 may perform logic on the received request and generate the response object for transmission to client device 105. In generating the response, servlet 164 can access one or more databases, call methods, or perform other actions. In one embodiment, a response wrapper associated with the response may record the mechanism used by servlet 164 to generate the response. For example, the response may be generated using a writer method, an output stream or some other mechanism. In any case, the response wrapper will save the writing mechanism information. In another embodiment, servlet 164 may configure length information for the response. The length information may be saved to the response itself as a length tag. The length tag may specify the length or size of the response (for example, 200 bytes). This may be manipulated later if the response is amended to include performance monitoring code or other information code.

Supplemental servlet filter 163 receives the content response from servlet 164, processes the response if needed, and sends the content response to custom servlet filter 162 at step 1460. Supplemental servlet filter 163 may process the response by including any needed action as discussed above with respect to step 1440. Next, custom servlet filter 162 receives the response from supplemental servlet filter 163 and processes the response at step 1470. In one embodiment, custom servlet filter 162 adds performance monitoring code to the response. The performance monitoring code may be JavaScript or some other type of code. Adding performance monitoring code to the content response is discussed in more detail below with respect to FIG. 16. After processing the content response, custom servlet filter 162 transmits the response to servlet container 161 at step 1480. The response is now ready to be sent back to browser application 110 at client device 105.

FIG. 15 illustrates an example of servlet identification table 590. The servlet identification table of FIG. 15 may be used to implement table 131 of FIG. 1C. The table of FIG. 15 includes columns for a unique identification number for received requests and servlet identification information. Each unique identification number corresponds with a request received by the application server. The servlet associated with each request identification number is the servlet used to process that particular request. As discussed above, this data is saved to a table, or other format, by custom servlet filter 162 at step 1430 at FIG. 14. The same servlet used to generate a response from a content request can be used to change or modify the response, if needed. The data of the table of FIG. 15 can be accessed to ensure that further processing of a response (associated with a particular request unique identification number) is performed by the appropriate servlet (the servlet corresponding to the unique identification number).

Figure 16:
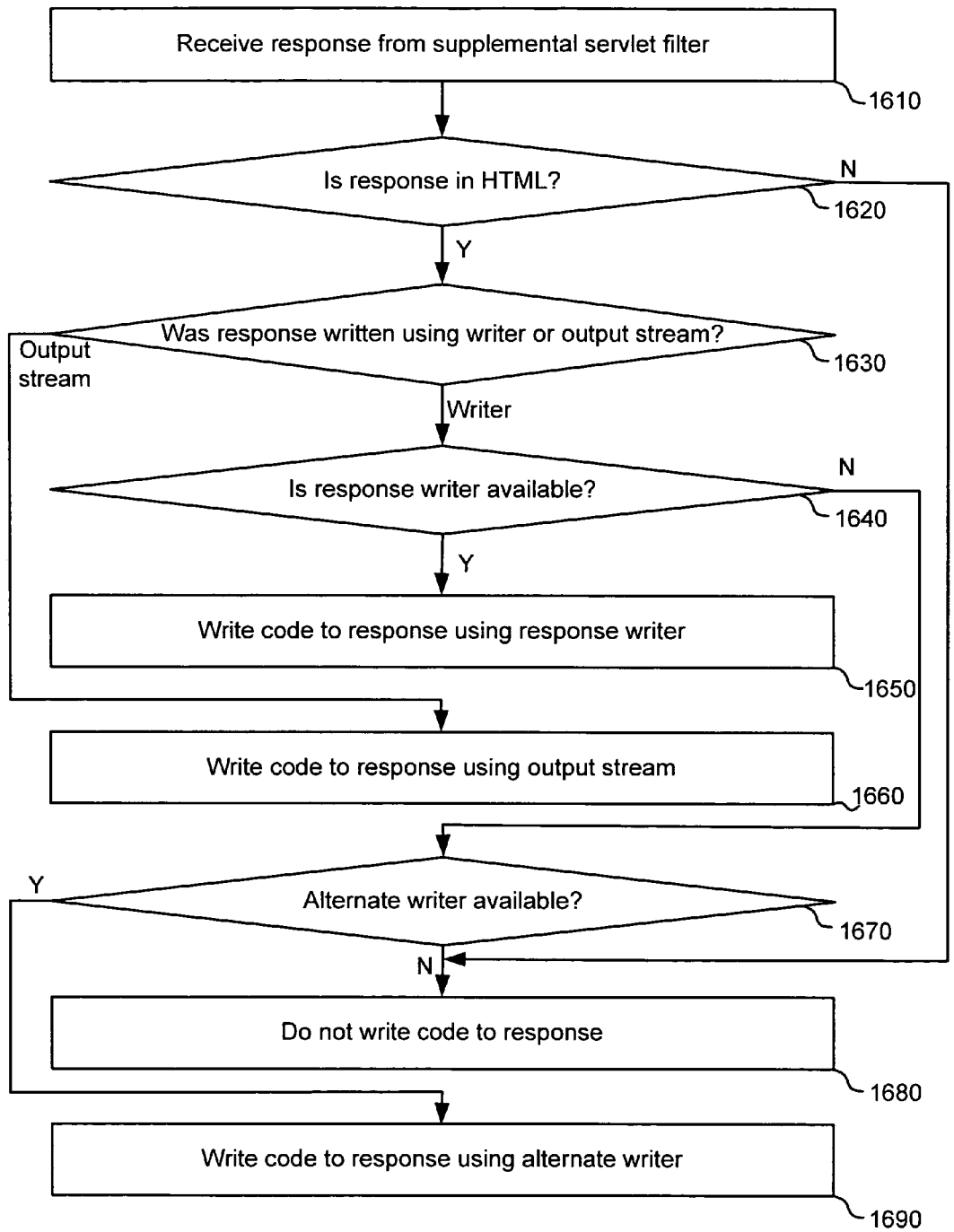
FIG. 16 illustrates an embodiment of a flowchart for processing a response by a custom servlet filter.

FIG. 16 illustrates an embodiment of a method for processing a content response by custom servlet filter 162. FIG. 16 illustrates more detail of step 1470 of FIG. 14. First, a content response is received by custom servlet filter 162 from supplemental servlet filter 163 at step 1610. Next, a determination is made as to whether the received response is in HTML at step 1620. In one embodiment, the determination is made by querying the response object. The query may comprise of a call to a method for retrieving a Multi-Purpose Internet Mail Extension (MIME) type of the response object comprising the response. For example, the method may be a "get MIME type" method. The method call will retrieve the MIME type associated with the response. The response from the get MIME type method should indicate whether the MIME type is HTML or some other format. Custom servlet filter 162 may analyze the response from the method to determine whether the content response is in HTML format or not. If the response is determined to be HTML, operation continues to step 1630. If the response is determined to not be in HTML, then operation continues to step 1680. In one embodiment, in addition to determining the MIME type of the received content response, a portion of the response object may be parsed to confirm it has a particular format. For example, a header portion of the response may be parsed to determine if it is in HTML format.

A determination is made as to whether the content response was written using a writer method or output stream at step 1630. In one embodiment, a Get Writer query can be made to the response object comprising the response. A response object wrapper having information associated with how the response was generated may intercept and reply to the Get Writer query. In one embodiment, the response object wrapper may record the mechanism used by servlet 164 to generate the object at step 1450 of the flowchart of FIG. 14. If it is determined that the response was written using a writer method, operation continues to step 1640. If it is determined that the response was written using an output stream, operation continues from step 1630 to step 1660.

If a writer method was used to generate the response, a determination is made as to whether the particular response writer object used to generate the content response is available at step 1640. In this case, the response writer object used to generate the content response is needed to add additional content to the content response. In one embodiment, the response writer object may not be available if it is closed or currently in use. Custom servlet filter 162 can call the desired response writer to determine whether it is available or not. In this case, the writer will send a response indicating whether it is closed or unavailable. If the response writer is determined to be available at step 1640, operation continues to step 1650. If the writer method is not available, operation continues to step 1670.

If the writer method used to generate the response is determined to be available at step 1640, JavaScript or some other appropriate type of code is written to the response using the available response writer at step 1650. The code written to the response may include response identification data, code used to transmit time data back to application server 130 from client device 105, and code used to store, access and configure data files, browser cookies or other files at browser application 110. In another embodiment, in addition to writing the code to the response, the response writer may be used to change the response length data. In one embodiment, the response generated by servlet 164 includes data indicating the length or size of the response. The response length can be changed to reflect the addition of the performance monitoring code. In this case, the writer is used to change the length tag to reflect the length of the response which includes the performance monitoring code.

If a determination is made at step 1630 that the response was written using an output stream, then the performance monitoring code is written to the response using an output stream at step 1660. The code written using an output stream may be similar to that written using a response writer at step 1650. The flowchart of FIG. 16 then ends at step 1660.

If a determination is made at step 1640 that the response writer is not available, a determination is then made as to whether an alternate writer is available at step 1670. The alternate writer may be provided by custom servlet filter 162 or some other source. If no alternate writer is available, operation continues to step 1680. If an alternate writer is available, operation continues to step 1690. At step 1680, no performance monitoring code is written to the response and operation of the flowchart ends. At step 1690, performance monitoring code is written to the response using the alternate writer. The code written to the response using the alternate writer at step 1690 is similar to the performance monitoring code using original response writer at step 1650. The flowchart of FIG. 16 then ends at step 1690.

After a response is sent by application server 130 to browser application 110 of client 105, application server 130 will eventually receive a content load complete message. The content load complete message is sent by browser application 110 in response to loading the content of the content response. Once the content load complete message is received, application server 130 will process the message. In some cases, the content load complete message will only contain a unique identifier for the content response sent by the application server. This may be the result of browser application 110 not having registered performance monitoring code prior to receiving a particular content response. In this case, the processing of the content load complete message includes retrieving the content identifier and capturing the time at which the message was received at application server 130. In other cases, the content load complete message may include a response identifier and time information. In this case, the time information is retrieved from the message, the time the message was received is captured, and application server 130 processes the time information.

Figure 17:
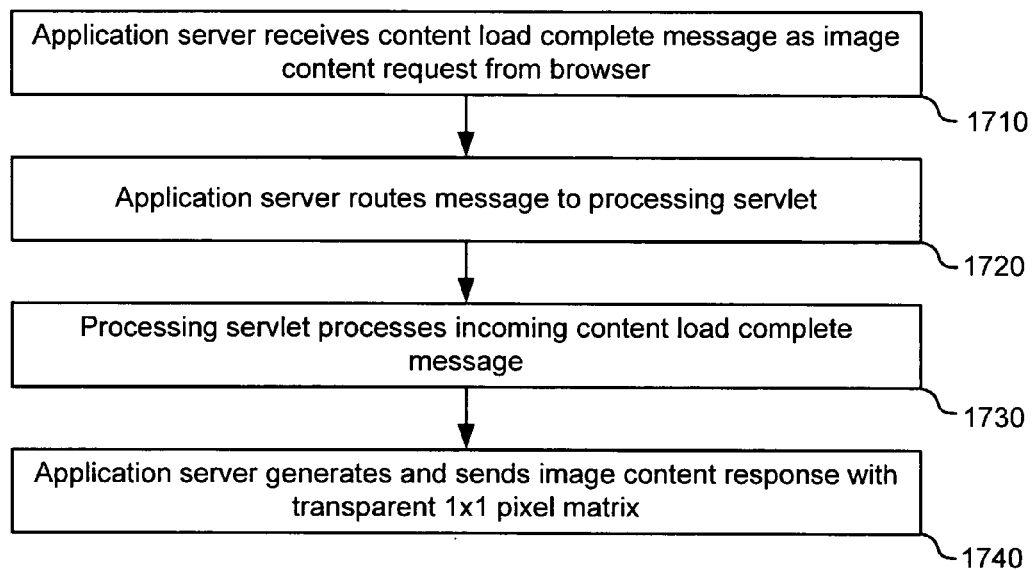
FIG. 17 illustrates an embodiment of a flowchart for processing time information received from a client device.

FIG. 17 illustrates a flowchart of an embodiment for processing time information received by application server 130 in a content load complete message. the flowchart of FIG. 17 illustrates more detail for step 1330 of the flow chart of FIG. 13. First, application server 130 receives a content load complete message as an image content request from browser application 110 at step 1710. In this case, the message containing the timing information is in the form of a request for image data. In one embodiment, the timing information may be stored in the URL of the image request. Thus, the domain of the application server may be included in the URL along with information retrieved by the performance monitoring code at browser application 110.

Next, application server 130 routes the received message to the appropriate processing servlet within application server 130 at step 1720. In one embodiment, application server 130 determines the appropriate servlet from servlet identification table 131. In this case, application server 130 retrieves the request identification information contained in the image content request. As discussed above, the image content request may include the request identification information as part of the URL to which the request is sent to. Once the response identification information is retrieved, application server 130 may query table 131 with the response identification information to determine the corresponding servlet. The corresponding servlet is the servlet used to generate the response associated with the content load complete message.

Once the processing servlet receives the content load complete message, the servlet processes the message at step 1730. In one embodiment, the servlet processes the incoming message by extracting time information and other data from the response and determining the response time and other time information metrics. Step 1730 is discussed in more detail below. Next, application server 130 generates and sends an image content response with a transparent 1×1 pixel matrix at step 1740. The image content response is sent to browser application 110 in response to the image content request comprising the content load complete message. The data associated with the image content response is of minimal consequence because the image pixels are transparent and have an area of one pixel.

As discussed above with respect to step 1730 of flowchart 17, a processing servlet may process time information to calculate a response time and other time information metrics. Calculation of a response time is discussed below with respect to FIG. 18. The other time information metrics that may be calculated include network latency, page load time, application server processing time and other information. Network latency is the time required for communicating a request, response, content load complete message or other message over a network. In some cases, the network latency may be the sum of the time that a content request, content response and content load complete message spend being communicated over a network. These times can be calculated by application server 130 by taking the difference between the time that the particular communication (e.g., a content request or content response) is sent or received by application server 130 and the time that the communication is received or sent by browser application 110. The page load time can be calculated as the difference between the time a content response is received by browser application 110 and the time an On Load event is detected (thereby indicating the content has been loaded). The application server processing time may be determined by calculating the difference between the time a content request is received and the time a corresponding content response is transmitted.

Calculation of the response time may differ depending on the timing information available. In one embodiment, calculation of a time response and/or other timing information metrics may utilize an ordered list of computations, or a decision tree. Each computation in the ordered list may involve an information category. For example, for calculating a response time, the ordered computation list may first list a computation involving a primary click data. In this case, if the available timing information (the available timing information including timing information received from a client device, timing information captured by a server, and other timing information associated with a content request) includes data which falling under the category of primary click data, then that data would be used to calculate the response time. If primary response time data is not available, the data corresponding to the next highest ordered timing information category is used to calculate the response time (or whatever timing information metric being calculated). Processing timing information using an ordered list of computations is discussed in more detail below with respect to FIG. 18.

Figure 18:
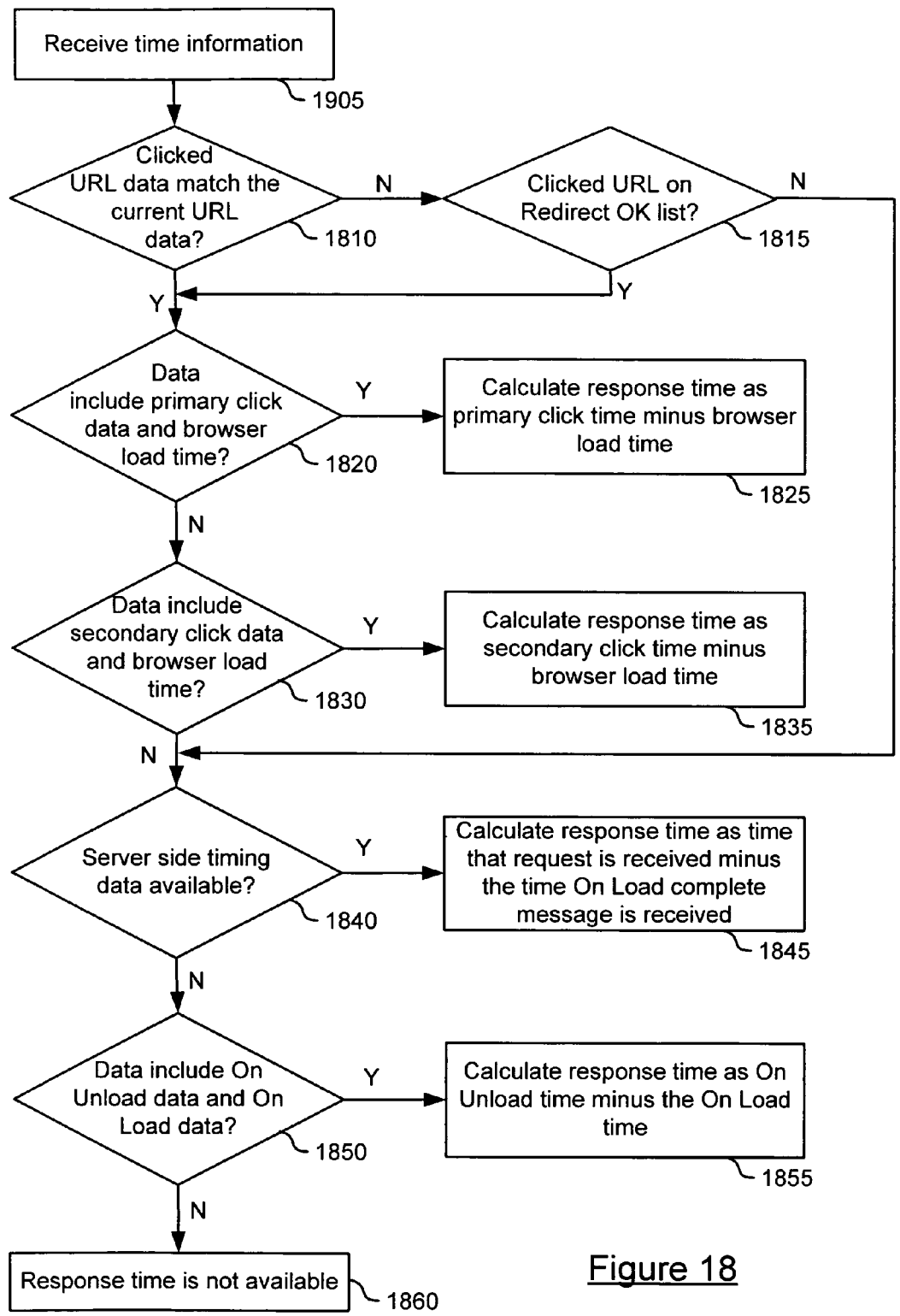
FIG. 18 illustrates an embodiment of a flowchart for determining a response time.

FIG. 18 illustrates a flowchart of an embodiment for determining a response time. Time information is received at step 1805. The time information is received by servlet 164 after being routed by application server 110. Next, a determination is made by servlet 164 as to whether clicked URL data within the time information matches current URL data within the time information at step 1810. With respect to FIG. 5, the clicked URL corresponds to the URL associated with the user selection at step 550. The current URL is the URL of the content provided by browser application 110 at step 570 after an On Load event has been detected.

If the URLs do not match, browser application 110 may have gone "off the grid" and accessed an intervening server after receiving the content response from application server 130. This is discussed in more detail with respect to FIGS. 19-20 below. In this case, the time information associated with the content request sent by browser application 110 may not accurately reflect the performance of browser application 110 in retrieving and providing the content. Thus, alternative time information may be used to determine a response time for the content request. If the clicked URL and current URL data do match, operation continues to step 1820. If the clicked URL data does not match the current URL data, a determination is made as to whether the clicked URL is located on a redirect list at step 1815. In this embodiment, application server 130 may maintain a list of clicked URLs for which it is acceptable to have a different current URL. If the clicked URL is contained on the redirect list at step 1815, the flowchart continues to step 1820. If the clicked URL does not exist on the redirect list, the flowchart continues to step 1840.

A determination is made at step 1820 as to whether the timing information received at step 1805 includes primary click data and a browser load time. The primary click data, as discussed above with respect to FIG. 9, may relate to user selection of an anchor or form element within a content page. The browser load time, or On Load time, is the time at which the browser time was retrieved in response to detecting an On Load event at the browser application. If the time information received includes primary click data and browser load time, the response time is calculated by servlet 164 as the difference in time between the primary click time and the browser load time at step 1825. If the time information does not include the primary click data and the browser load time, a determination is made as to whether the timing information includes a secondary click time and the browser load time at step 1830.

As discussed above with respect to FIG. 9, a secondary click time may include the time at which user input was received for an element besides an anchor element or form element in a content page provided by browser application 110. If the timing information does include a secondary click data and browser load time, a response time is calculated as the difference in time between the secondary click time and the browser load time at step 1835. If the timing information does not include the secondary click time and a browser load time, a determination is made as to whether server side timing data is available at step 1840. Server side timing data may be available if application server 130 recorded the time at which a content request from browser application 110 was received and the time at which a content load complete message was received. If server side timing data is available, the response time is calculated as the difference in time between the time a request is received by application server 130 and the time a content load complete message is received at step 1845.

If server side timing data is not available, then a determination is made as to whether the timing information received at step 1805 includes On Unload data and On Load data at step 1850. In this case, if the timing information does include On Unload data and On Load data, the response time is calculated as the difference between those two times. This is the time required to retrieve content from a browser application cache. If the timing information does not include On Unload data and On Load data, the flow chart continues to step 1560 where the response time is not calculated as determined at step 1860.

As discussed above, browser application 110 may access an intervening application server when loading content in response to a user selection. Thus, browser application 110 may send a request to application server 130, receive a content response from application server 130, send a second content request to a secondary application server and receive a second content response from the secondary application server before sending a content load complete message to application server 130. The second content request may be the result of a resource located at the secondary application server and required to complete the content of the first content response, a redirection to a second content by the first content response (for instance, a redirected page or login page), an advertisement, or some other data from a third party. Access of an intervening server by browser application 110 results in more time required to complete the loading of content received from application server 130. As a result, the calculated response time associated with the first content response may not be desirable in some situations.

Figure 19:
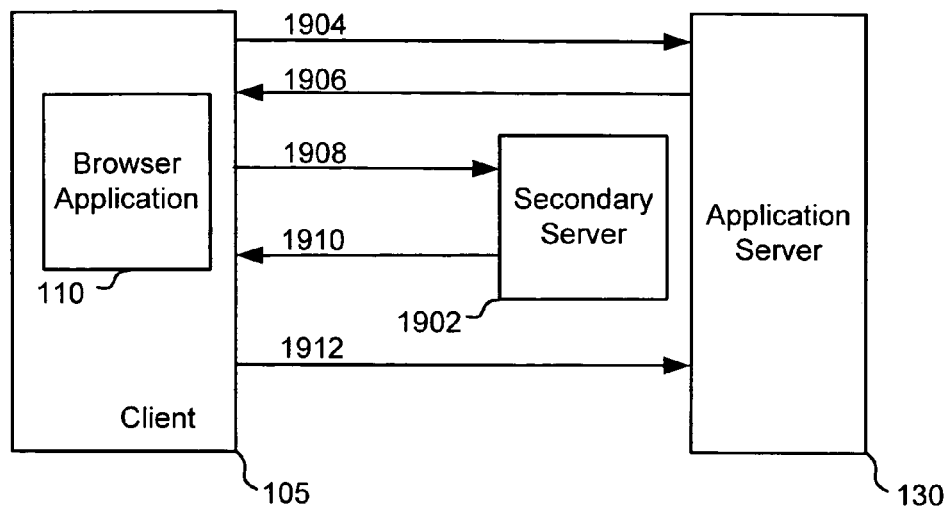
FIG. 19 illustrates an embodiment of a system for determining response time with an intervening content request.

FIG. 19 illustrates a block diagram illustrating access of an intervening server while processing a content request. The block diagram of FIG. 19 includes client 105, application server 130, and secondary server 1902. Client 105 sends a content request to application server 130 as communication 1904. Application server 130 receives the request, generates a content response, and sends the content response to client 105 as communication 1906. Client 105 receives the response and determines that an intervening server must be accessed in order to provide additional content. Thus, a browser application 110 must go "off grid" and access an application server in addition to the one associated with the original content request. Client 105 sends an intervening content request to secondary server 1902 as communication 1908. Secondary server 1902 receives the intervening content request, generates a response, and transmits the response to client 105 as communication 1910. Client 105 receives the intervening content response, retrieves content from the response, provides the content as part of a completed page to a user, and transmits content load complete message to application server 130 as communication 1912.

As illustrated in FIG. 19, client 105 accesses secondary server 1902 in order to provide completed content to a user for content request 1904. When calculating the response time for the request, the calculated time can differ depending on if the time information used to generate the response time is captured at application server 130 or browser application 110. When generated using time information captured at application server 130, the response time is determined as the difference in time between receipt of communication 1904 and receipt of communication 1912. When generated using time information captured by browser application 110 on client 105, the response time may be calculated by determining the difference in time between sending communication 1904 and sending communication 1908, sending communication 1204 and sending communication 1212, or sending communication 1908 and sending communication 1912. In either case, the response time will differ depending on how it is calculated when an intervening server is used.

Figure 20:
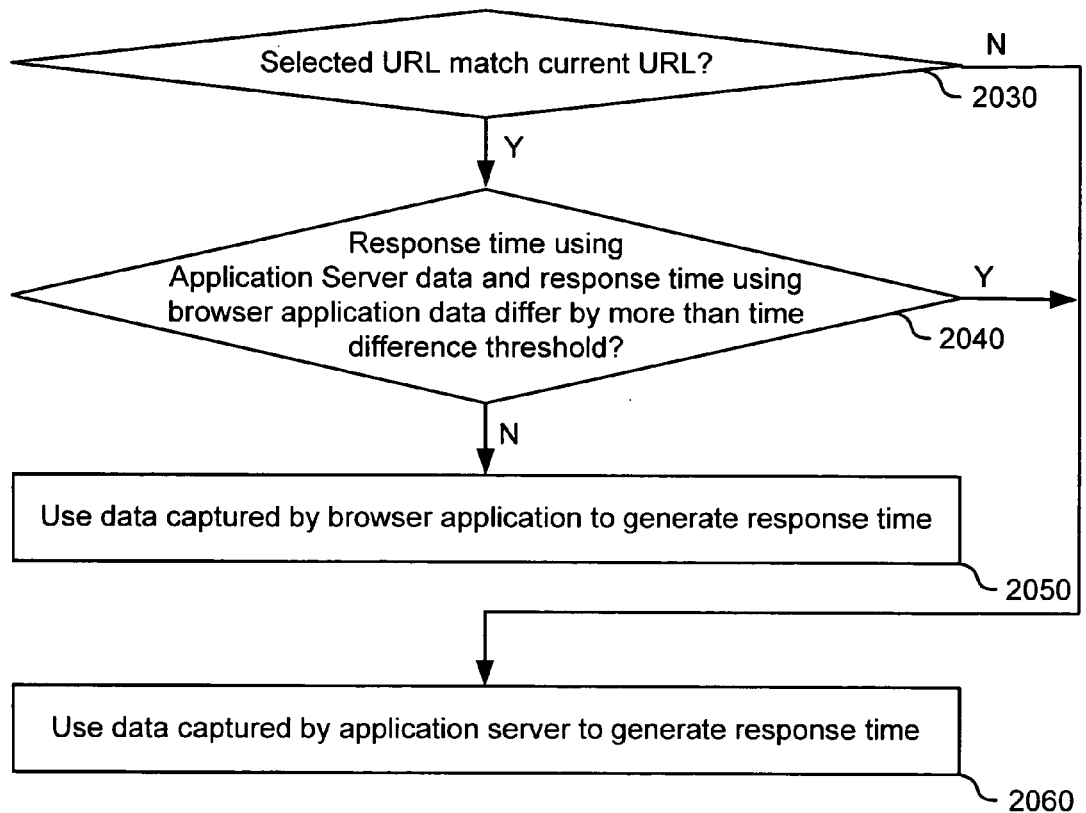
FIG. 20 illustrates an embodiment of a flowchart for selecting a response time determination method.

FIG. 20 illustrates an embodiment of a flowchart for calculating a response time for a request associated with an intervening server. In one embodiment, the flowchart of FIG. 20 provides more detail for step 1810 of the flowchart of FIG. 18. First, a determination is made as to whether a selected URL associated with a request matches a current URL associated with the request at step 2010. The selected URL (the URL associated with a user selection that initiates the original content request) and the current URL (the URL associated with of the loaded content) can be retrieved from a content load complete message received by application server 130. If there is an intervening content request, the selected URL will not match the current URL because the current URL will overwrite the selected URL in browser application 110. If the selected URL does not match the current URL, the flowchart continues to step 2040. If the selected URL does match the current URL, then the flowchart continues to step 2020.

If the selected URL and current URL are determined to match, a determination is made as to the difference between the response time calculated using application server captured data and the time response determined using browser application captured data is greater than a threshold time period at step 2020. The response time calculated from application server captured data is the difference between the time the content request is received and the time the content load complete message is received. The response time calculated using browser application data is the difference between the time the user selection is received and the time the content is completely loaded in browser application 110. If the two response times differ by an amount greater than the threshold time period, then the browser application may have gone "off grid" although the selected URL and the current URL match. The threshold period of time may be selected such that it reflects a likely time delay that an "off grid" situation would cause. In one embodiment, the threshold period may be five seconds.

If the difference in response times is greater than the threshold time period at step 2020, the flowchart of FIG. 20 continues to step 2040. In this case, it is likely that there was an intervening content request. At step 2040, the application server method is used to determine the response time. In one embodiment, when the flowchart of FIG. 20 provides more detail of step 1810 of the flowchart of FIG. 18, a determination is made that the selected URL and current URL do not match, and the flowchart of FIG. 18 continues to step 1815. If the difference in response times is less than the threshold time period at step 2020, it is likely that no intervening content request occurred. The flowchart of FIG. 20 continues to step 2030, wherein the URLs are determined to match. Here, it is determined that no intervening content request occurred, or that the intervening content request was minimal.

Returning to the flowchart of FIG. 13, after application server 130 receives and processes a content load complete message, processed time informant is sent to agent 8 at step 1340. The processed time information includes the response time and other processed time information discussed above. After receiving the processed time information, agent 8 aggregates the time information for multiple page loads and sends the aggregated time information to enterprise manager 120 at step 1350. This is discussed in more detail below with respect to FIG. 21.

Figure 21:
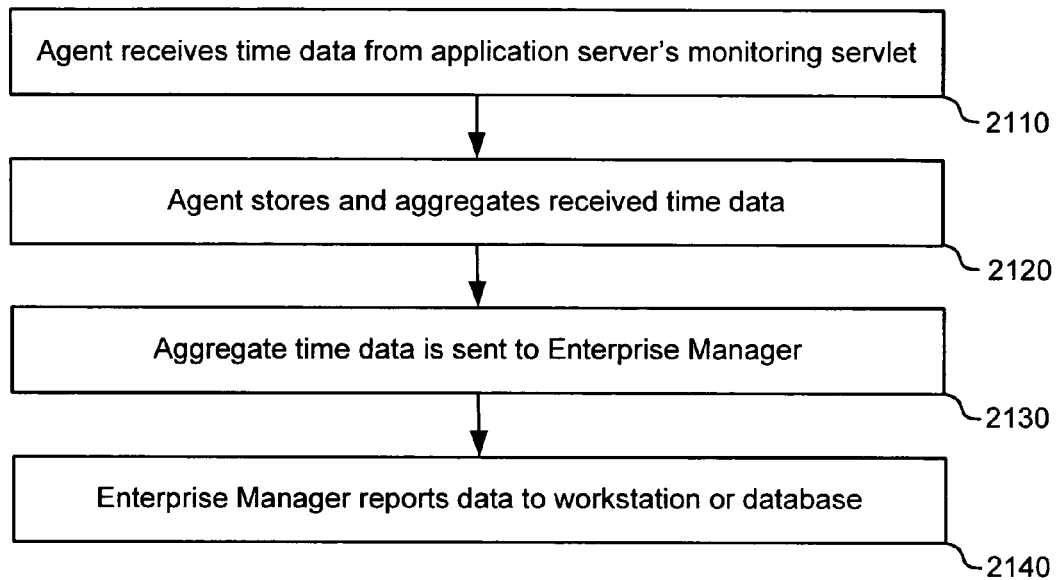
FIG. 21 illustrates an embodiment of a flowchart for processing response time data.

FIG. 21 illustrates an embodiment of a flowchart for processing and transmitting data to enterprise manager 120 by an agent 8. In one embodiment, the flowchart of FIG. 21 provides more detail for step 1350 of the flowchart in FIG. 13. First, processed time information is received by agent 8 from application server 130 at step 2110. Agent 8 then stores and aggregates the received time data at step 2120. In one embodiment, the time data is stored and aggregated into "buckets" or groups. The data may include the network latency, response time, the selected URL, the servlet used to process the content request, the identification number associated with the content response, the time the content request was sent and received, the time the content response was sent and received, the time the time information was sent and received (as a content load complete message), the IP address for client 105 and application server 130, and other information. Next, the aggregated time information is sent to enterprise manager 120 at step 2130. The data may then be reported by enterprise manager 120 to a workstation or database at step 2140. Reporting of the data may be done proactively by enterprise manager 120 or in response to a request or other event. An administrator or other backend user may then analyze the aggregated time data reported by enterprise manager 120. The data may be analyzed in several ways, including determining the strengths and weaknesses between a communication between client 105 and application server 130.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A machine-implemented method for monitoring performance of an application, comprising:
   sending a first request by a client, the first request sent over a network to an application server;
   receiving machine-executable code at the client in response to sending the first request;
   sending a second request by the client, the second request sent over the network to the application server;
   determining whether each of one or more first events are associated with user selection of either an anchor or a form submit;
   storing first time information in either a primary file or a secondary file by executing the machine-executable code at the client, the storing first time information includes storing the first time information by a first event handler executing said machine-executable code in response to detecting each of the one or more first events in a browser application, the first time information is stored in the primary file if the first event is a primary click event associated with an element that includes either an anchor or a form submit, the first time information is stored in secondary file if the first event is a secondary click event associated with an element other than an anchor or a form submit;

accessing a second time information by executing the machine-executable code at the client, the accessing second time information includes accessing the second time information by a second event handler executing said machine-executable code in response to detecting a second event in said browser application, the second time information associated with a response received by the client in response to the second request; and sending the first time information and the second time information, the first time information includes time information from the primary file if the primary file exists and contains the first time information, the first time information includes time information from the secondary file if the secondary file exists and contains the first time information.

2. The machine-implemented method of claim 1, wherein the first request and the second request are sent by said browser application.

3. The machine-implemented method of claim 1, wherein said storing the first time information includes:

storing the first time information by said browser application, said storing includes said browser application executing said code.

4. The machine-implemented method of claim 1, wherein the primary file is a first cookie and the secondary file is a second cookie.

5. The machine-implemented method of claim 1, further comprising:

receiving input from a user, the first request and the second request are sent in response to the user input.

6. The machine-implemented method of claim 5, wherein the first time information includes the time the user input was received.

7. The machine-implemented method of claim 1, further comprising:

storing third time information in response to detecting an on unload event in a browser application.

8. The machine-implemented method of claim 1, wherein said accessing the second time information includes:

retrieving the second time information in response to detecting an on load event in a browser application, said on load event is said second event.

9. The machine-implemented method of claim 1, wherein said sending the first time information and second time information is performed in response to receiving the response to the second request.

10. The machine-implemented method of claim 1, further comprising:

clearing the first time information from memory in response to providing content to a user, the content accessed from the response to the second request, said clearing includes removing at least one of said primary file or said secondary file.

11. The machine-implemented method of claim 1, further comprising:

clearing the first time information from memory in response to receiving user input that initiates sending a third request to the application server, said clearing includes removing at least one of said primary file or said secondary file.

12. One or more processor readable storage devices having processor readable code stored on said processor readable storage devices, said processor readable code which when executed on one or more processors causes the one or more processors to perform a method comprising:

receiving a first request from a client over a network;

sending machine-executable performance monitoring code to the client in response to the first request, the machine-executable performance monitoring code is capable of being executed at the client to provide timing information associated with subsequent requests from the client, the performance monitoring code is configured to register code with event handlers associated with a browser application in order to monitor the subsequent requests, the performance monitoring code is configured to record the time that primary click events associated with selection of a hyperlink or form submit occurred in a primary file and to record the time that secondary click events associated with an element other than a hyperlink or form submit occurred in a secondary file, the performance monitoring code is configured to send first timing information and the second timing information, the first timing information includes time information from the primary file if the primary file exists, the first timing information includes time information from the secondary file if the secondary file exists;

receiving a second request from the client over the network;

sending a content response to the client in response to the second request;

receiving timing information from the client in response to the content response, the timing information including the first timing information that is associated with the second request and a second timing information associated with the content response; and computing a response time associated with the second request, the response time computed at least in part from the timing information.

13. The one or more processor readable storage devices of claim 12, wherein the first timing information includes a time that user input was received, the second request sent in response to the user input.

14. The one or more processor readable storage devices of claim 12, wherein the second timing information includes the time that content in the content response was provided to a user.

15. The one or more processor readable storage devices of claim 12, wherein the receiving timing information from the client in response to the content response includes receiving a third request from the client, the third request includes the timing information and a request for additional content.

16. The one or more processor readable storage devices of claim 15, wherein the third request includes an image request.

17. The one or more processor readable storage devices of claim 12, wherein the timing information includes a time associated with an on unload event detected by said browser application.

18. The one or more processor readable storage devices of claim 12, wherein the performance monitoring code is able to store the first timing information in response to receiving user input through a browser application after receiving the content response.

19. An apparatus for processing data, comprising:

a communication interface;

a storage device having processor readable code stored thereon; and one or more processors in communication with said storage device and said communication interface, said processor readable code which when executed on said one or more processors causes said one or more processors to perform a method comprising:
  receiving a request for content from a client;
  sending machine-executable performance monitoring code to said client over a network in response to receiving said content request, said machine-executable performance monitoring code is able to be executed by said client to provide timing information related to subsequent requests for content from said client, the performance monitoring code is configured to register code with event handlers in order to monitor the subsequent requests, the event handlers detect events associated with the subsequent requests, the performance monitoring code is configured to record in a primary file the time that primary click events associated with selection of a hyperlink or form submit occurred and to record in a secondary file the time that secondary click events associated with an element other than a hyperlink or form submit occurred, the performance monitoring code is configured to send first timing information and the second timing information, the first timing information includes time information from the primary file if the primary file exists, the first timing information includes time information from the secondary file if the secondary file exists; and
  receiving the first and second timing information over the network from the client, the first timing information including a time associated with receiving user input by the client, the second timing information including a time associated with providing content to the user by the client in response to the user input, said first and second timing information pertains to a subsequent request for content from said client.

20. The apparatus of claim 19, wherein said sending performance monitoring code includes:
  inserting the performance monitoring code into a response to said request for content; and
  sending the response to said request for content to the client.

21. The apparatus of claim 19, wherein the performance monitoring code is JavaScript.

22. The apparatus of claim 19, wherein the receiving timing information includes receiving an image source request.

23. The apparatus of claim 19, wherein said method further comprises:
  reporting the timing information to a workstation.

24. One or more processor readable storage devices having processor readable code stored on said processor readable storage devices, said processor readable code which when executed on one or more processors causes the one or more processors to perform a method comprising:
  receiving a content response from a server, the response including processor executable performance monitoring code;
  executing the processor executable performance monitoring code to modify one or more event handlers, said one or more event handlers modified to store timing information, said one or more event handlers detect events associated with a content page for which the timing information pertains and record the time of the events, the events include primary click events associated with selection of a hyperlink or form submit and secondary click events associated with an element other than a hyperlink or form submit;
  sending a request to the server after receiving the content response;
  executing the processor executable performance monitoring code to store timing information in a first file and a second file, the time that a user clicked on an anchor or form submit on the content page is stored in the first file, the time that the user clicked on an element other than an anchor or a form submit is stored in the second file, the timing information associated with the request; and
  transmitting the timing information to the server, the transmitting includes transmitting timing information for the first file if timing information for the first file exists and transmitting timing information for the second file if timing information for the second file exists.

25. The one or more processor readable storage devices of claim 24, wherein said method further comprises:
  executing the processor executable performance monitoring code to modify one or more event handlers of an application, the one or more event handlers modified to store the timing information.

26. The one or more processor readable storage devices of claim 24, wherein said transmitting includes:
  retrieving the stored timing information;
  accessing additional timing information in response to providing content from the content response to a user; and
  transmitting the stored timing information and the additional timing information to the server.

27. The one or more processor readable storage devices of claim 24, wherein said storing timing information includes:
  storing the time that a user clicked on an anchor or form submit in a first cookie; and
  storing the time that a user clicked on an element other than an anchor or form submit in a second cookie.

28. The one or more processor readable storage devices of claim 27, wherein the first and second cookies include event information associated with the timing information contained in the first and second cookies.

29. A method for monitoring, comprising:
  receiving timing information from a client in response to a content response, the timing information having one or more fields of data;
  comparing the timing information fields of data to one or more ordered timing information categories, each of the categories provides a different calculation for computing a time to respond to a request from said client for content; and
  determining a response time from the timing information data associated with the data fields that correspond to the highest ordered timing information categories, said determining a response time includes:
  (a) comparing a clicked URL and a current URL within the timing information, if the clicked URL and the current URL match, then:
  (b) determining whether the data fields include primary click data and a first browser load time, the primary click data includes a time at which either an anchor or form submit is selected in a content page at the client, and computing the response time as the difference between the primary click time and the first browser load time if available in the timing information;
  (c) if the data fields do not include primary click data and a first browser load time, then determining whether the fields of data include secondary click data and a second browser load time, the secondary click data includes a time at which an element other than an anchor or a form submit is selected at the client, and computing the response time as the difference between the secondary click time and the first browser load time if available in the timing information; and (d) if the clicked URL and the current URL do not match, then determining the response time based on either server side timing data if available or based upon On Unload Data and On Load data if available in the timing information.

30. The method of claim 29, further comprising, if the clicked URL and the current URL match and if the data fields do not include either primary click data or secondary click data:
determining whether the fields of data include an On Unload data, the on unload data associated with the time that content is unloaded in said browser application.

31. The method of claim 29, wherein said determining whether said data fields include a first browser load time and said determining whether said data fields include a second browser load time include:
determining whether the fields of data include an on load data, the on load data associated with a time that content is loaded in said browser application.

32. One or more processor readable storage devices having processor readable code stored on said processor readable storage devices, said processor readable code which when executed on one or more processors causes the one or more processors to perform a method comprising:
receiving timing information from a client device;
comparing a clicked URL and a current URL within the timing information, if the clicked URL and the current URL match, then:
determining whether said information from said client device includes timing information associated with a response time to a request from said client for content from a server, said determining whether the information from said client device includes timing information includes determining whether said information from the client device includes data associated with an On Click event at the client device and a load time associated with a response to the request, the load time is associated with a time that a browser application loads content associated with the response, the On Click event occurs in response to selection of an element within a content page provided by the browser application;
performing a computation using the timing information from said client device if said information from said client device includes the timing information associated with said response time to said request, the performing a computation using the timing information from said client device includes using timing information associated with said On Click event detected at the client device, the performing the computation includes using timing information that defines when an On Click event associated with selectable content occurred, if available, otherwise using timing information that defines when an On Click event associated with non-selectable content occurred;
generating timing information associated with said response time to said request if said information from said client device does not include timing information associated with said response time to said request, said generating is based on events detected at the server;
performing a computation using said generated timing information if said information from said client device does not include timing information associated with said response time to said request;
if the clicked URL and the current URL do not match, then performing a computation based on either server side timing data if available or based upon On Unload Data and On Load data if available in the timing information; and
providing a response time to said request for content from said client based on the computation performed.

33. The one or more processor readable storage devices of claim 32, wherein the performing a computation using timing information from said client device includes a computation for a response time associated with a user selection.

34. The machine-implemented method of claim 1, wherein said sending a first request by a client includes sending a request for content other than the code.

35. The machine-implemented method of claim 34, wherein said receiving code at the client in response to sending the first request includes receiving the code along with content that satisfies the request for content in the first request.

36. The one or more processor readable storage devices of claim 12, wherein said receiving a first request from a client over a network includes receiving a request for content other than the performance monitoring code.

37. The one or more processor readable storage devices of claim 36, wherein said sending performance monitoring code to the client includes sending the performance monitoring code along with content that satisfies the request for content in the first request.

38. The machine-implemented method of claim 1, wherein the first event is selection of an element in a content page displayed by said web browser.

39. The machine-implemented method of claim 1, further comprising storing a Uniform Resource Locator (URL) that is associated with said first event if said first event is associated with user selection of either an anchor or a form submit.

40. The machine-implemented method of claim 39, further comprising sending the URL with the first time information and the second time information.

41. The machine-implemented method of claim 1, further comprising registering the machine-executable code with the first event handler and the second event handler.

42. The machine-implemented method of claim 1, further comprising configuring the first event handler and the second event handler to execute the machine-executable code.

43. The machine-implemented method of claim 1, further comprising registering the machine-executable code with a plurality of event handlers that are associated with a content page, the plurality of event handlers include the first and second event handlers, the second request is due to user selection of an element associated with the content page, the first event handler executes as a result of the user selection.

44. The machine-implemented method of claim 43, wherein the second event handler executes in response to loading content associated with the response to the second request in said browser application.

45. The machine-implemented method of claim 1, wherein the first event handler is an On Click handler of said web browser.

* * * * *